(12) United States Patent
Godsill et al.

(10) Patent No.: US 10,282,038 B2
(45) Date of Patent: May 7, 2019

(54) SIGNAL PROCESSING SYSTEMS

(71) Applicant: InputDynamics Limited, Cambridgeshire (GB)

(72) Inventors: Simon Godsill, Cambridgeshire (GB); Giovanni Bisutti, Cambridgeshire (GB); Jens Christensen, Roskilde (DK)

(73) Assignee: InputDynamics Limited, Cambridgeshire (GB)

( * ) Notice: Subject to any disclaimer, the term of this patent is extended or adjusted under 35 U.S.C. 154(b) by 0 days.

(21) Appl. No.: 15/284,740

(22) Filed: Oct. 4, 2016

(65) Prior Publication Data
US 2017/0024032 A1    Jan. 26, 2017

Related U.S. Application Data

(63) Continuation of application No. 13/774,434, filed on Feb. 22, 2013, now Pat. No. 9,459,733, which is a
(Continued)

(30) Foreign Application Priority Data

| Aug. 27, 2010 | (GB) | ................................. | 1014309.7 |
| Feb. 23, 2012 | (GB) | ................................. | 1203138.1 |
| May 2, 2012 | (GB) | ................................. | 1207625.3 |

(51) Int. Cl.
*G06F 3/043* (2006.01)
*G06F 3/041* (2006.01)

(52) U.S. Cl.
CPC ............ *G06F 3/043* (2013.01); *G06F 3/0418* (2013.01); *G06F 3/0433* (2013.01)

(58) Field of Classification Search
CPC ...... G06F 3/043; G06F 3/0433; G06F 3/0436; G06F 3/0418
(Continued)

(56) References Cited

U.S. PATENT DOCUMENTS

| 6,891,527 B1 | 5/2005 | Chapman et al. |
| 7,345,677 B2 | 3/2008 | Ing et al. |
| (Continued) | | |

FOREIGN PATENT DOCUMENTS

| GB | 2385125 | 8/2003 |
| WO | 2006069596 | 7/2006 |
| (Continued) | | |

OTHER PUBLICATIONS

Ng Andrew, Generative learning algorithms 2008.*
(Continued)

*Primary Examiner* — Roberto W Flores
(74) *Attorney, Agent, or Firm* — Billion & Armitage; Benjamin C. Artmitage

(57) ABSTRACT

This invention relates to methods, apparatus, and computer program code for processing acoustic signal data to determine where an object has been tapped with a stylus, finger nail or the like. The method involved storing a set of labelled training data comprising digitized waveforms from a sensor for taps at a plurality of different locations. The labelled training data is then processed to determine mean value and covariance data for the waveforms, which is afterwards used in conjunction with a digitized waveform of a tap at an unknown location to identify the location of the tap. Preferably the covariance is decomposed into a plurality of basis functions for each region each with a respective weighting, which are used to represent captured data for an unknown tap and parameters of the representation are classified to locate the tap.

12 Claims, 16 Drawing Sheets

Related U.S. Application Data continuation-in-part of application No. PCT/GB2011/051494, filed on Aug. 8, 2011.

(58) Field of Classification Search
USPC .................. 345/173, 177, 178; 178/18.04
See application file for complete search history.

(56) References Cited

U.S. PATENT DOCUMENTS

| | | |
|---|---|---|
| 7,511,711 B2 | 3/2009 | Ing et al. |
| 7,855,718 B2 | 12/2010 | Westerman |
| 2003/0217873 A1 | 11/2003 | Paradiso et al. |
| 2004/0090432 A1 | 5/2004 | Takahashi |
| 2005/0083313 A1 | 4/2005 | Hardie-Bick et al. |
| 2005/0174338 A1 | 8/2005 | Ing et al. |
| 2006/0192763 A1 | 8/2006 | Ziemkowski |
| 2006/0262104 A1 | 11/2006 | Sullivan et al. |
| 2008/0316184 A1 | 12/2008 | D'Souza |
| 2009/0009488 A1 | 1/2009 | D'Souza et al. |
| 2009/0157206 A1 | 6/2009 | Weinberg |
| 2009/0207131 A1 | 8/2009 | Togami et al. |
| 2010/0085216 A1 | 4/2010 | Ms |
| 2010/0117993 A1 | 5/2010 | Kent |
| 2011/0096036 A1 | 4/2011 | McIntosh et al. |
| 2011/0137968 A1 | 6/2011 | Ing |
| 2011/0309982 A1* | 12/2011 | Poisel ............... G01S 5/04 342/378 |

FOREIGN PATENT DOCUMENTS

| | | |
|---|---|---|
| WO | 2009093056 | 7/2009 |
| WO | 2012025733 | 3/2012 |

OTHER PUBLICATIONS

International Preliminary Report of Patentability and Written Opinion for corresponding International Application No. PCT/GB2011/051494 dated Oct. 24, 2011.

International Search Report for corresponding International Application No. PCT/GB2011/051494 dated Oct. 24, 2011.

* cited by examiner

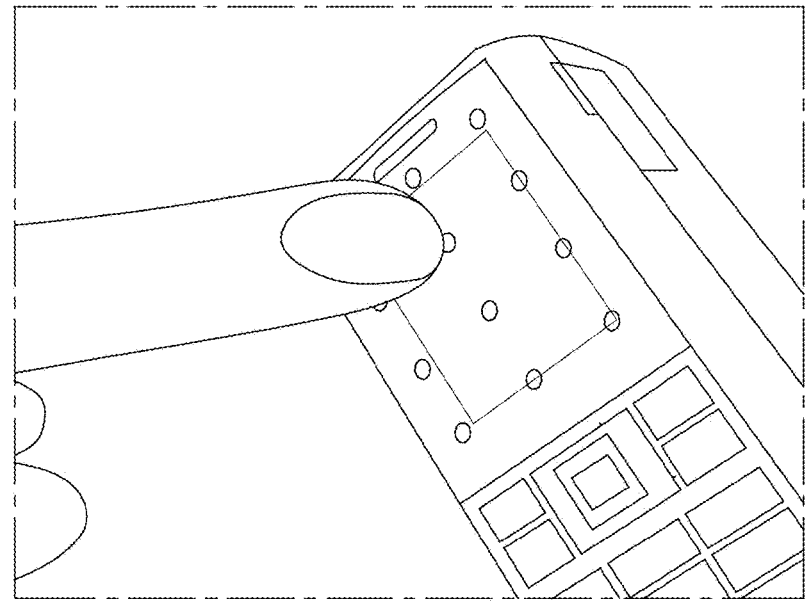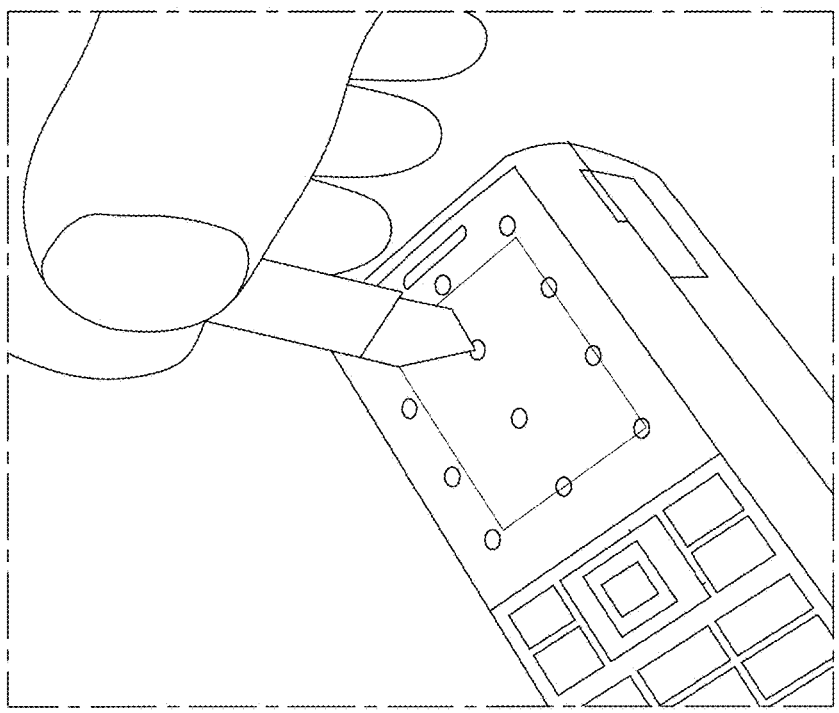
Fig 5

SIGNAL PROCESSING SYSTEMS

RELATED APPLICATIONS

This application is a Continuation of application Ser. No. 13/774,434, filed on Feb. 22, 2013, which is a Continuation-in-Part of International Application No. PCT/GB2011/051494, filed on 8 Aug. 2011, which claims priority to GB Application No. 1014309.7, filed on 27 Aug. 2010; and is also a Continuation-in-Part of GB Application No. 1203138.1, filed on 23 Feb. 2012; and is also a Continuation-in-Part of GB Application No. 1207625.3, filed on 2 May 2012, and which applications are incorporated herein by reference. A claim of priority to all, to the extent appropriate, is made.

FIELD OF THE INVENTION

This invention relates to methods, apparatus, and computer programme code for processing acoustic signal data to determine where and/or whether an object has been tapped with a stylus, pen, finger nail or the like.

BACKGROUND TO THE INVENTION

We have previously described, in WO2009/093056, a mobile phone handset incorporating one or more acoustic sensors to pick up the unique acoustic signature of an input area struck by the user. We now describe details of some particularly preferred approaches which have been tested and found to work effectively. Background prior art can be found in US2010/085216; GB2385125; US6891527; US2011/096036; and US2003/217873, and also in patents/applications assigned to Sensitive Object, such as U.S. Pat. No. 7,511,711; U.S. Pat. No. 7,345,677; WO2006/069596; and US2005/174338.

Broadly speaking an aspect of the problem we address is to make acoustical measurements from one or more microphones embedded in a physical device. This may be an electronic device such as a mobile phone or laptop computer or a microphone or accelerometer may be attached to an inert object to make the object touch sensitive. The acoustic signal from a user tapping on the device or object using, for example, a stylus, pen tip, finger nail, or finger, is detected and analysed (either in the device or remotely) in order to determine where the object has been tapped. The resolution of this determination is variable for example the object may be provided with a grid of touch sensitive regions akin to a keyboard, or a simple differentiation may be made between, say, two regions such as one or other half of the device/object. In still other approaches the determination may simply be as to whether the device has been tapped in a particular region; or high resolution or quasi-continuous determination of a tap location may be made. In a typical application an icon may be displayed on the screen of a mobile phone in a touch-sensitive region, and user-tapping of the icon may then be employed, for example to navigate a menu. However it will be appreciated that many applications of the technology are possible.

Although the concept is simple, there are significant difficulties in achieving reliable operation. This is because the received "tap" waveforms are embedded in environmental noise such as speech, music, vehicle noise, general background noise and so forth, as well as interference. Moreover some of this noise/interference may mimic the acoustic signal from a tap. Another substantial difficulty is that the waveform measured when repeatedly tapping at the same position is not repeatable but exhibits a random variability, presumably from small differences in how the tapping is actually performed, how the device is held, and so forth.

There therefore exists a need for algorithms which can accurately and repeatably identify the region of a device on which a user has tapped.

SUMMARY OF THE INVENTION

According to the first aspect of the invention there is therefore provided a method of detecting the location of a tap on an object having at least one acoustic sensor, the method comprising: storing a set of labelled training data, said labelled training data comprising digitised waveform data of waveforms captured from said sensor for taps at a plurality of different locations on said object in combination with location data indicating for each said waveform the location of the tap; processing said labelled training data to determine, for each of a plurality of tap-sensing regions of said object, mean value data and covariance data for at least two said waveforms captured from taps in the said region, said mean value data defining a mean of said at least two waveforms and said covariance data defining covariance of said at least two waveforms; capturing tap data comprising a digitised waveform of a tap at an unknown location captured by said sensor; and determining a tapped region of said object from said tap data and from said mean value data and said covariance data from said plurality of regions.

In embodiments the labelled training data comprises location data and (digitised) time domain analogue waveforms captured for a plurality of taps at each position of a grid of touch sensitive regions, preferably using a variety of different tapping styles/instruments and the like. The waveforms for each grid region are time-aligned and then, for the set of time-aligned waveforms, mean and covariance functions are calculated. The mean comprises time series data, in effect an average waveform (and thus is a vector; the covariance comprises a matrix, in effect expressing the variability of the tap waveforms. Each touch sensitive region has a pair of these functions, that is in embodiments a mean value vector and a covariance matrix. The skilled person will recognise that a matched filter classifier might only use the mean, but embodiments of the techniques we describe improve upon this by using the variability/covariance data, in some preferred embodiments applying principle component analysis techniques as described later. Thus embodiments of the techniques we describe achieve improved performance by improved modelling of the random variabilities mentioned in the introduction above. It will be recognised that the resolution of the location data/tap sensing regions may be selected according to the application and they range from very low resolution, for example just one of two regions, to very high or quasi-continuous resolution.

The mean and covariance data enable the calculation of the probability of a captured set of tap data (y) given a tap at a particular region j and with a particular start time/sample $n_0$, $p(y|j,n_0)$. In embodiments a formula for this probability p is based upon an assumption that the probability of tap location and time is Gaussian, and background noise is assumed (in the later formulae x denotes a clean tap signal without background noise). However, this Gaussian assumption is not necessary, and, further, a probability calculated with a Gaussian assumption seems to be reasonably accurate even though the underlying statistics may not be Gaussian.

The probabilities $p(y|j,n_0)$ may be calculated for all the tap-sensing regions j and for all the potential tap start positions $n_0$, thus providing a matrix of probabilities and the most likely $(j,n_0)$ may be selected by identifying the largest probability (an argmax approach). Alternatively a Bayesian approach may be employed, multiplying each probability by the prior probability of a tap at region j, time $n_0$, $p(j,n_0)$. As described in more detail later, if all tap positions are equally likely, the prior probability of a tap at region j is 1/J, where J is the total number of tap-sensing regions; similarly assuming each tap time is equally likely, this introduces a factor of 1/N, where N is the total number of possible tap times. Preferably the probability of no tap (1−α) is also included, where α is a non-critical tuneable parameter.

With either the Bayesian or argmax approach the probabilities calculated may comprise a ratio of the probability of a tap to the probability of no tap (in the later mathematics labelled as a j=0 case), in which case a ratio of > unity indicates that it is more likely than not that there has been a tap. In practice to reduce the risk of false positives a threshold of > unity for this ratio of probabilities may be employed.

In some preferred embodiments a calculated probability $p(y|j,n_0)$ takes account of (is dependent on) a determined level of background noise ($\sigma_v^2$). The background noise may be determined from the captured tap data, for example by taking an average value of the data (assuming the tap does not add much energy) or by a more sophisticated technique. An example procedure then performs a calculation over two loops, one running over possible tap positions j, a second running over tap start time $n_0$ in the captured tap data y, for each j, $n_0$ calculating the probability of the captured data, more preferably the ratio of this to the no-tap null hypothesis, the tap region j defining which set of mean value data and covariance data to use in the probability calculation. In an electronic device the mean value data and covariance data for each of the tap-sensing regions may be stored in non-volatile memory, for example at manufacture or downloaded to the device later. In some embodiments the loop runs over all the possible tap times ($n_0$), but preferably, to reduce the amount of computation, the calculation is performed over only a sub-set of the possible tap times ($n_0$'s) for example by calculating the energy in the captured signal and discarding the low energy portions of the signal and restricting the probability calculations to higher than average portions of the captured signal, where a tap is most likely. By setting an appropriate energy threshold a relatively restricted range of potential tap (start) times may be employed.

The probability determination may be performed in software, hardware, or a combination of the two. In particular, in some preferred implementations of the probability calculation described later using basis functions the probability calculation involves a step which is effectively implementation of an FIR (finite impulse response) filter which may, for example, be efficiently implemented in hardware.

In some preferred implementations of the method, a multi-component model of the tap waveforms for each region captured during the training procedure is employed. Thus the captured tap data at y is modelled as a sum of basis functions t with amplitudes determined by a corresponding set of unknown parameters θ, together with background noise. This is motivated by the observation that tapping repeatedly at the same position results in different waveforms because there is a significant amount of unavoidable random variation in, for example, how the object/device is held, precisely how the tap takes place, and also, surprisingly, based on environmental parameters such as temperature. Thus the idea is to model the random variation using a relatively small number of underlying components, which enables modelling of the wave shape as well as the amplitude of the tap response. This is not as simple as just considering the object to be "ringing" with different frequency components when tapped—instead the idea is to approximate the covariance of the waveforms arising when repeatedly tapping the same region j by a set of underlying components. By employing a relatively small number of components the covariance is effectively denoised so that the determined probabilities are more robust. In general the components used to model sets of waveforms from different tap regions j are different (although in embodiments there may be some components in common—see later). In practice a relatively small total number of components (I) has been found to be adequate, in embodiments <10, for example 4 or 5.

When modelling the covariance of the waveforms from a particular tap region it is convenient to assume a Gaussian distribution with a zero mean (a zero mean because the mean value data has already been subtracted off). The covariance data for the waveforms is typically a matrix (with one axis as time/sample), and this can be decomposed into a set of basis functions by any one of a range of techniques with which the skilled person will be familiar including, but not limited to, singular value decomposition, principal component analysis (an orthogonal decomposition), independent component analysis, non-negative matrix factorisation, latent variable analysis, and so forth. Thus in one approach the covariance matrix C is decomposed into eigenvalues/eigenvectors and the eigenvectors with eigenvalues below a threshold disregarded. (The threshold may be set, for example by examining the relative fall-off of the eigenvalues for the data set). Then the eigenvalues give the variances of the weighting components θ of the basis functions, and the eigenvectors provide the set of basis functions t for a particular tap-sensitive region j.

When the probabilities $p(y|j,n_0)$ are calculated these are calculated using covariance data for a region defined by the aforementioned eigenvalues and eigenvectors, that is the set of basis functions t for a region j and the corresponding variances of the weightings θ. In such an approach typically the sets of basis functions t for each region are stored in non-volatile memory on the electronic device performing the tap location. The determination of the sets of basis functions, and the expression of the covariance data in terms of these, may be performed during the training phase. Thus the variance of the weights of the basis functions in the model are used rather than the "raw" covariance of the wave forms (the raw covariance data may be discarded once the basis function components for each region have been determined). Thus it will be recognised that the variance of the wave forms when tapping a particular region is expressed, in embodiments, in terms of the variance of components of a decomposition of (the covariance of) these waveforms.

Once the probabilities $p(y|j,n_0)$ have been determined they may be processed in a number of ways, as previously described. Alternatively, however, in embodiments of this multicomponent approach it is not necessary to determine the probabilities $p(y|j,n_0)$ in order to determine the tapped region—instead determination of a tapped region may employ the estimated weights of the basis functions for the tapped regions. Thus, more particularly, a set of basis weightings θ may be determined for each candidate tapped region (and optionally tap time) and input into a classifier such as a neural network, support vector machine or the like. This is because the basis function weightings θ can be treated as features extracted from the data.

As previously mentioned, although in embodiments the basis functions are different for different tap positions, some or all of the basis functions may be common to one or more of the tap-sensitive regions. To achieve this there may be initially a decomposition across a plurality of different tap-sensitive regions, performing a principal component analysis (or similar) on all the data, thus selecting components representing taps over the plurality of touch-sensitive regions. Then, because basis functions for the individual regions are also needed, a second decomposition may be performed region-by-region.

Optionally embodiments of the method may employ training of different parameter sets (including basis functions) for different temperatures. Then an internal temperature sensor of the phone (or other electronic device) may be used to switch between different models (parameter sets). Additionally or alternatively embodiments may automatically detect which temperature the device is at from the waveform data (again using probabilities, in a similar manner to that described above). A similar consideration/approach applies for different input modalities, e.g. pen/stylus/finger and so forth. Again, different sets of templates/parameters could be learned for different environments; again, optionally, embodiments may automatically detect which type of input mode is being employed from the waveform data (using the determined probabilities).

Although we have described embodiments in which one of a set of (predetermined) tap-sensitive regions is identified, a variant of the approach may be employed to determine when a single tap-sensitive region is tapped, for example a region to wake-up a device. In this case a j=2 model may be employed in which one of the regions is the region to be tapped, for example the wake-up region, and the other region comprises part or all of the remainder of the object/device. The invention also contemplates a simplified version of this in which the system is trained by tapping just a single region, in effect a j=1 model and a probability $p(y|j,n_0)$ is determined. In such a case a simplified training regime may be employed, repeatedly tapping on the single touch-sensitive region.

In some preferred embodiments of the above described procedures the touch-sensitive object is a portable electronic device, for example a mobile phone, PDA (personal digital assistant), laptop computer or the like. Preferably such a device incorporates a microphone which is used as the acoustic sensor. However in other applications an object may be made tap-sensitive by attaching an acoustic sensor, for example a microphone or accelerometer, and training a system to identify tapped regions, as previously described.

In the above described aspects of the invention preferably mean value data and covariance data are employed, but potentially other models of the variability of the tapping waveforms may be employed, for example using a non-linear, non-Gaussian model, a Bayesian approach, or the like. Thus aspects of the invention contemplate other types of statistical data employed to represent variability of the captured tap waveforms, in particular in the context of a multi component model approach as described above.

Thus in a related aspect the invention provides a method of detecting the location of a tap on an object having at least one acoustic sensor, the method comprising: storing a set of labelled training data, said labelled training data comprising digitised waveform data of waveforms captured from said sensor for taps at a plurality of different locations on said object in combination with location data indicating for each said waveform the location of the tap; processing said labelled training data using a statistical model having a plurality of different parameters associated with each said region to determine from said waveforms, for each said region, statistical data representing the variability of said parameters resulting from tapping said object in said region; capturing tap data comprising a digitised waveform of a tap at an unknown location captured by said sensor; and determining a tapped region of said object from said tap data and said statistical data.

The algorithms can be extended to classify taps that do not lie exactly on the training grid. This is important for devices where menu grids change during navigation, e.g. web browsing. In a simple version of this, templates and components are 'interpolated' to give new templates/components at new off-grid tapping positions and classification proceeds using these new templates at the new grid positions. This allows a continuous coverage of the whole screen in principle—ie. not grid-based at all.

The algorithms can be extended to classify taps that do not lie exactly on the training grid. This is important for devices where menu grids change during navigation, e.g. web browsing. In a simple version of this, templates and components are 'interpolated' to give new templates/components at new off-grid tapping positions and classification proceeds using these new templates at the new grid positions. This allows a continuous coverage of the whole screen in principle—ie. not grid-based at all.

The inventive concept may also be extended/modified to identify off-grid tapping using interpolation of templates and/or covariance functions.

Thus in a further aspect the invention provides a method [and portions of the method implemented on a training computer system and on a portable electronic device] of detecting the location of a tap on an object having at least one acoustic sensor, the method comprising: storing a set of labelled training data, said labelled training data comprising digitised waveform data of waveforms captured from said sensor for taps at a plurality of different locations on said object in combination with location data indicating for each said waveform the location of the tap; processing said labelled training data to determine, for each of a plurality of tap-sensing regions of said object, statistical data comprising at least mean value data for at least two said waveforms captured from taps in the said region, said mean value data defining a mean of said at least two waveforms; processing said mean value data from said waveforms of a plurality of said regions to perform one or both of interpolation between and extrapolation from said means of said waveforms of said regions to provide mean value data defining waveform mean values at regions in addition to the regions used to capture said training data, preferably to increase a resolution at which mean value data for said regions is available; capturing tap data comprising a digitised waveform of a tap at an unknown location captured by said sensor; and determining a tapped region of said object from said tap data and said statistical data. In a simple implementation the captured tap data from an unknown location may be employed in a ML (maximum likelihood) or MAP (maximum apriori probability) or similar process, in combination with the interpolated/extrapolated mean value data, to identify the unknown tap location. However in more sophisticated approaches the statistical data statistical data may comprise further data, as previously described, for example covariance data and/or data defining one or more sets of basis functions. In such a case the statistical data may be used to determine probabilities for the unknown tap location along similar lines to those previously described, in particular to identify a most probable location for the tap.

The aforementioned aspects of the invention relate to both capturing training data and to use of the training data to identify a tapped region of an object/device. However the skilled person will recognise that in many instances these two parts of the procedure will be separated so that, for example, training of a system might occur only once for, say, a particular handset or particular model of handset, for example under control of a manufacturer. However, in particular for a portable device as contrasted with an inert object to which an acoustic sensor has been attached, the identification of the tapped region will generally be lifted by software and/or hardware on the electronic device.

Thus the invention also contemplates as separate aspects:
1. the portion of the methods according to aspects/embodiments of the invention described above implemented in a training phase in which classification data such as mean value data and covariance data, or statistical data, is determined for a touch-sensitive object/device; and
2. the portion of the above described procedures according to aspects/embodiments of the invention implemented on an electronic device processing a captured acoustic signal using the data previously derived from a training phase (classification data such as mean value data and covariance data, or other statistical data) to identify a most probably tapped region.

Thus in a related aspect the invention provides a method of providing data for detecting the location of a tap on an object having at least one acoustic sensor, the method comprising: storing a set of labelled training data, said labelled training data comprising digitised waveform data of waveforms captured from said sensor for taps at a plurality of different locations on said object in combination with location data indicating for each said waveform the location of the tap; processing said labelled training data to determine, for each of plurality of tap-sensing regions of said object, mean value data and covariance data for at least two said waveforms captured from taps in the said region, said mean value data defining a mean of said at least two waveforms and said covariance data defining covariance of said at least two waveforms; storing said mean value data and said covariance data from said plurality of regions for use with captured tap data comprising a digitised waveform of a tap at an unknown location captured by said sensor for determining a tapped region of said object.

Similarly the invention also provides a method of detecting the location of a tap on an object having at least one acoustic sensor, the method comprising: capturing tap data comprising a digitised waveform of a tap at an unknown location captured by said sensor; retrieving statistical data for a plurality of regions of said object wherein said statistical data comprises data characterising waveforms from said sensor when said object is tapped in each of a plurality of tap-sensing regions of the object; and determining said tapped region of said object from said tap data and from said statistical data for said plurality of regions.

The invention also provides a computer system comprising a processor, working memory and programme memory, the programme memory storing processor control code to implement a method according to an aspect/embodiment of the invention as described above.

Thus in a further aspect there is provided a computer system for providing data for detecting the location of a tap on an object having at least one acoustic sensor, the computer system comprising: an input to receive data from said acoustic sensor; working memory; program memory storing processor control code, and a processor coupled to said input, to said working memory and to said program memory; and wherein said program memory stores code for implementing a method as described above.

In a further, complementary aspect there is provided an electronic device configured to detect the location of a tap on the device, the device comprising an acoustic sensor and processor control code to implement a method (or a portion of a method) identifying a tapped region) as described above.

Adaptive Threshold Techniques

According to a further aspect of the invention there is provided a method of detecting a tap on an object having at least one acoustic/vibration sensor, the method comprising: capturing tap data comprising a digitised waveform of a tap on said object captured by said sensor; processing said captured tap data by applying a tap detection procedure to generate time series tap metric data comprising data providing a detection metric of a potential said tap at a succession of times—in particular to generate time series probability data comprising data identifying the probability of a potential said tap at a succession of times; determining a classifier to classify said detection metrics or probabilities of potential said taps into one or more detected taps; and applying said classifier to said tap metric/probability data to detect said tap on said object; wherein said determining of said classifier comprises identifying a region of background noise in said captured tap data; and determining said classifier from data in said region of background noise.

In embodiments the above described system enables improvements in making small, simple electronic devices touch-sensitive using an in-built microphone (or other acoustic/vibration sensor, for example an accelerometer).

In embodiments the tap metric data comprises tap probability data, for example determined from a Bayesian detector as described above, but in other approaches different tap detection metrics may be employed.

In embodiments identifying the region of background noise comprises identifying potential taps for which the probability is greater than a threshold value and then defining the region of background noise to exclude time windows around each of these potential taps. Additionally or alternatively background noise may be identified using data from a second sensor to identify regions with less than a threshold level of tap activity. The second sensor may be another acoustic sensor or an accelerometer or gyroscopic sensor, or two such second sensors may be present (if two are present then identification of a tap to remove from the background may require signals from both these sensors).

In embodiments the classifier may be determined by generating synthetic tap data comprising from the background noise and stored (genuine) tap data, then applying the tap detection procedure to this and afterwards setting the classifier to distinguish the synthesised genuine tap events, for example by setting a threshold probability value.

Optionally different classifiers/thresholds may be employed for different tap locations in a system configured to distinguish between different tap locations.

In a related aspect the invention provides a method of determining an adaptive threshold for acoustic tap detection using the above described technique.

In another aspect the invention provides and electronic device, such as a mobile phone, comprising a processor, working memory, program memory, and a communications interface, the program memory storing processor control code to implement a method as described above.

Remote Touch

According to a further aspect of the invention there is provided a touch sensing system comprising first and second electronic devices wherein said first electronic device comprises first electronics coupled to an acoustic sensor and to a first communications interface, and wherein said second electronic device comprises a computing system coupled to a second communications interface, wherein said first and second devices are able to communicate with one another via said respective first and second communications interfaces, wherein the touch sensing system is configured to use said second electronic device to detect a touch on said first electronic device using data from said acoustic sensor, and wherein said first electronic device comprises code to transmit sensed acoustic data from a said touch to said second electronic device, and wherein said second electronic device comprises code to process said sensed acoustic data to identify a user operation on said first electronic device.

In embodiments the above described system enables small, simple electronic devices such as a Bluetooth™ headset to be made touch-sensitive using an in-built microphone (or other acoustic/vibration sensor, for example an accelerometer). In this way the user controls may be supplemented or even, potentially eliminated. In embodiments of the system the two electronic devices have separate physical housings.

In embodiments the additional touch functionality may be implemented as a simple software upgrade of the two, paired electronic devices, with the relatively computationally intensive processing being performed on the second electronic device. Depending upon the implementation, it may even be possible to use existing code on the first electronic device already configured to transmit acoustic data to a second, paired device. Thus the invention also contemplates a method of upgrading at least a second electronic device as described above to provide touch sensing functionality to a first electronic device with which it is paired, by implementing acoustic processing process or control code on the second device.

The user operation sensed and identified may comprise, for example, a tap or swipe, and the system may then be configured to detect a location of the tap/swipe and/or a parameter of the tap or swipe, or to detect a plurality or sequence or temporal pattern of taps and/or swipes to identify the user operation. Thus, for example, a pattern of single, double or multiple tapping may be employed to perform a user operation and/or the length/speed/location or other parameter of a swipe may be used to identify a user operation (optionally a changing frequency or chirp may also be detected if a portion of the first electronic device is patterned or ribbed).

In embodiments the second electronic device is configured to perform an action responsive to the identified user operation. For example the second electronic device may be a mobile phone or similar and the action may be a directory-related action to look up a name and/or phone number. Any other examples of actions will occur to the skilled person, depending upon the type of device employed for the second electronic device including, but not limited to, game-play, music selection and the like. Additionally or alternatively data relating to the identified user operation may be passed back to the first electronic device and used to control the first electronic device. For example in the case of a Bluetooth™ (registered trademark) headset this may be a volume control, but the skilled person will recognise that depending upon the type of first electronic device, other forms of control may also be implemented albeit the first device may already have one or more local controls.

In embodiments of the system the second electronic device also includes code to feed back to the first device data representing the identified operation, in particular as audio data (which may be data encoding an audio signal or, for example, data labelling an audio signal such as a voice or tone signal for feedback to the user). In embodiments the first electronic device includes an audio output device and has code to provide audio feedback to the user responsive to the audio data. This may be simple confirmation data, for example that a user operation has been implemented, such as click-type feedback or the like, or the audio feedback may comprise a result of the identified operation, for example a name or phone number in the case of a directory look-up. However, the skilled person will appreciate that feedback to the user provided by the second device via the first device may also be provided in other ways, in particular visually, again depending upon the type of first electronic device and, for example, whether or not it is visible to the user when in use.

The communications interface between the first and second electronic devices may be a wired or wireless interface. For example a devices may be connected via a wired network connection or, in the case of a headset, by a simple wired connection. However In some preferred embodiments the first and second communications interfaces comprise wireless communications interfaces such as interfaces for Bluetooth™ communications.

In some preferred implementations the second electronic device comprises a mobile communications device/mobile phone or mobile computing device such as a touch pad, laptop, gaming device or the like or, potentially, the second electronic device could be a server, hub, base station or the like. Thus in embodiments the second electronic device may be in communication with a plurality of first electronic devices, optionally of different types performing a touch sensing/feedback operation for each. In one preferred implementation however, the first electronic device comprises a Bluetooth™ headset and the second electronic device comprises a mobile phone.

In embodiments the acoustic sensor comprises a microphone and the code on the second electronic device to process the sensed acoustic data comprises code to process this data responsive to stored or learned training data relating to the first electronic device, to identify the user touch operation.

In other aspects the invention provides, separately, a first electronic device, and a second electronic device as described above. In embodiments each electronic device may comprise a processor, working memory, program memory, and a communications interface, the program memory storing processor control code to implement a system as described above or a method as described later. The first electronic device further comprises at least an acoustic sensor such as a microphone.

In a related aspect the invention provides a method of remotely enabling touch-sensing operation of a first electronic device using a second electronic device, the method comprising: sensing touch of said first electronic device using an acoustic sensor of said first electronic device; transmitting acoustic touch sensing data from said first electronic device to said second electronic device; and processing said acoustic touch sensing data using said second electronics device to identify a touch sensitive user operation on said first electronic device.

The invention further provides a system for remotely enabling touch-sensing operation of a first electronic device using a second electronic device, the system comprising: means for sensing touch of said first electronic device using an acoustic sensor of said first electronic device; means for transmitting acoustic touch sensing data from said first electronic device to said second electronic device; and means for processing said acoustic touch sensing data using said second electronics device to identify a touch sensitive user operation on said first electronic device.

The invention further provides processor control code for the above described electronic devices, and to implement the above-described systems and methods, for example on a general purpose computer system or on a digital signal processor (DSP). The code is provided on a carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

These and other aspects of the invention will now be further described, by way of example only, with reference to the accompanying figures in which:

FIG. 5 shows examples of tapping with a stylus and with a finger nail on the mobile phone of FIG. 3 on one of a grid of tap-sensitive regions, the device being configured to identify the tapped region according to an embodiment of the invention;

DETAILED DESCRIPTION OF PREFERRED EMBODIMENTS

Broadly speaking we will describe approaches which involve a training phase in which one or more users taps repeatedly in one or more tapping modalities (stylus, finger, different temperatures) at specified locations on the device— e.g. on a carefully measured lattice of points on the screen surface of a mobile phone. (It has been found that there is variability caused by changes of temperature and change of device, e.g. different mobile phones of the same model). A training algorithm then learns templates and parameters used for subsequent classification of the data.

Random Process Method

Figure 8:
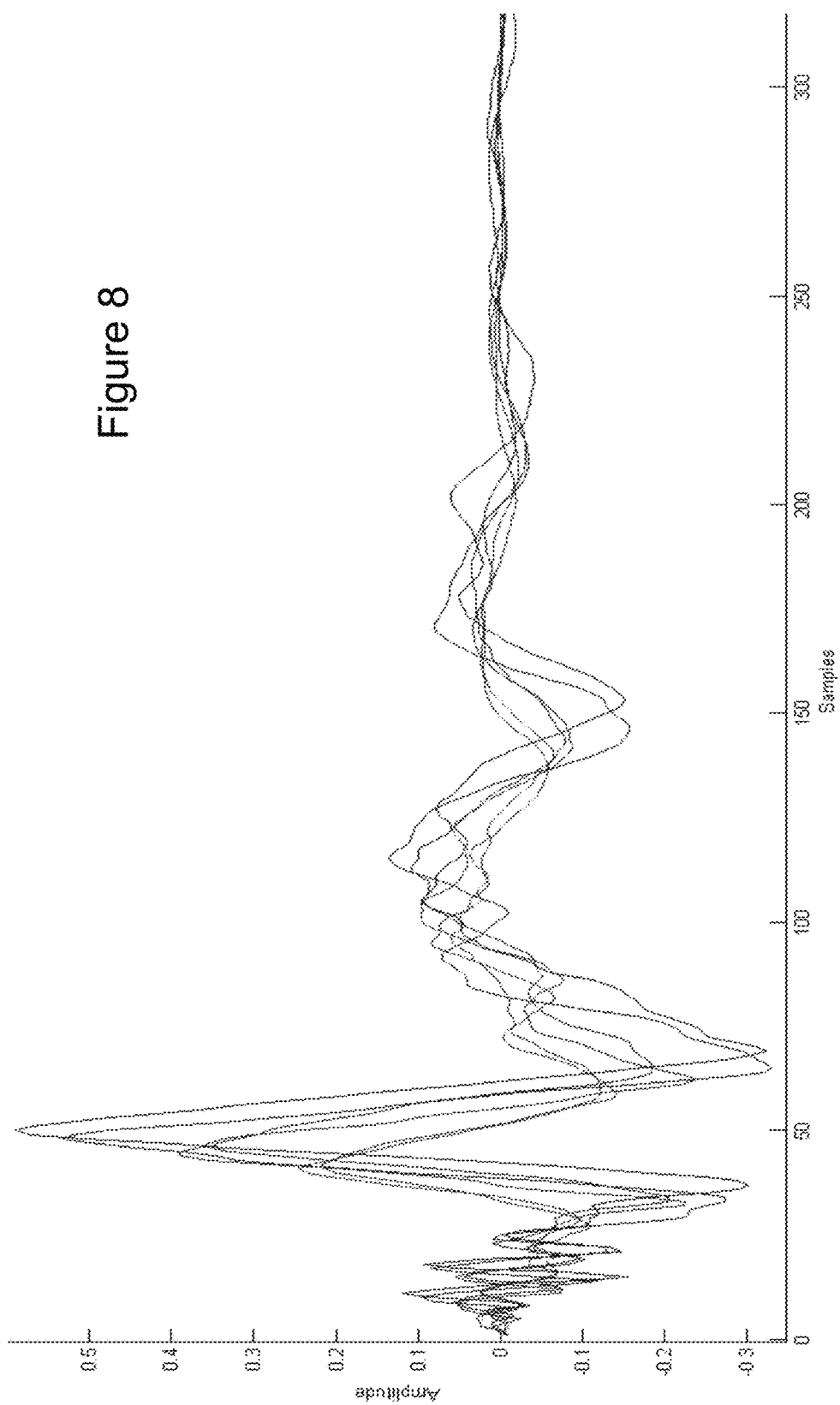
FIG. 8 illustrates variability of a captured tap waveform with temperature.

We first describe our random process method. The main idea here is to model the variability in tapping styles, style of handset holding, different handsets (of the same model type) and environmental conditions using a multiple component model, see for example the templates learned from the MAP method under different temperatures. It appears that the temperature has a significant effect on the mean template—see FIG. 8. Thus it seems questionable whether a simple ML or MAP method would be able to cope with this level of variation in tap waveform. Pulse variability has also been detected when users hold the devices in different ways, have the device on a surface and tap with nails or different styluses. One can label data based on position rather than the other factors mentioned above, and record the variability within the significant components.

In this general approach the tapping waveform at each location is modelled as a random process, whose parameters are different at each tapping location. The process is non-stationary because of the nature of the tapping process. If a tap occurs at time index $n_0$ the tapping process is regarded as a random draw from a random process $\{x_n; n_0, j\}$ where $n_0$ is the tapping time and j is the tapping position. There is no reason to assume that the process is Gaussian, other than analytic tractability, and it is quite likely that non-Gaussian heavy-tailed processes could do a good job of modelling the tapping processes. However, for simplicity, consider the Gaussian Process as a specific case. Here we will model a mean function for the process $\mu^j$ of length $M_j$ and a covariance function $c^j(n_1, n_2) = E[(x_{n_1} - \mu_{n_1}^j)(x_{n_2} - \mu_{n_2}^j)]$, defined for any pair of time indices $0 < n_1 < M_j+1$, $0 < n_2 < M_j+1$, which may be compiled into a full covariance matrix $C^j$, whose $n_1$, $n_2$ th element is $c^j(n_1,n_2)$. Then, a tap occurs at time $n_0$, the probability distribution for a sequence of measurements $x=[x_1, \ldots, x_N]$ is given by a multivariate Gaussian distribution that is obtained by time shifting the mean and covariance functions to the appropriate tap starting time $n_0$:

$$p(x|j,n_0)=N(\mu^j(n_0),C^j(n_0))$$

where $$\mu^j(n_0)=[0 \ldots 0\mu_1{}^j\mu_2{}^j \ldots \mu_{M_j}{}^j 0 \ldots 0]^T$$

such that the first non-zero element of $\mu^j(n_0)$ is at position $n_0$ and the n,m th element of $C^j(n_0)$ is defined $$c_{n,m}^j(n_0) = \begin{cases} c^j(n-n_0, m-n_0), & 0 < n-n_0, m-n_0 < M_j \\ 0, & \text{otherwise} \end{cases}$$

Training of the mean and covariance functions for this process can be done by obtaining many time-aligned tapping pulses from each tapping position and computing the mean and covariance function for each:

$$\hat{\mu}^j = \frac{1}{N^j}\sum_k x_k^j$$

$$C^j = \frac{1}{N^j}\sum_k (x_k^j - \hat{\mu}^j)(x_k^j - \hat{\mu}^j)^T$$

In the presence of zero-mean Gaussian background noise $v \sim N(0, \Sigma_v)$ the distribution of the observed data $y=x+v$ is then straightforwardly obtained as $$p(y|j,n_0)=N(\mu^j(n_0),C^j(n_0)+\Sigma_v)$$

In the classification algorithm this can be numerically evaluated using the following formula:

$$p(y \mid j, n_0) = \frac{1}{(2\pi)^{N/2}|C^j(n_0 + \Sigma_v)|^{1/2}} \exp\left((y - \mu^j(n_0))^T(C^j(n_0) + \Sigma_v)^{-1}(y - \mu^j(n_0))\right)$$

The computation of the matrix inverse in this expression will simplify substantially in certain cases, notably in the case where the noise v is independent and hence has a diagonal covariance matrix.

1. Non-Gaussian Extensions—Scaled Gaussian Processes

While the Gaussian process models user and environmental variability, we may wish to separate out a tapping strength parameter from the model, the notion being that the tapping strength should affect only the amplitude of the waveform and not its shape (assuming here a linear system). This can be done by modelling the process as a scaled version of the random process, and hence moving to a scaled mixture of Gaussian Processes (i.e. now in the non-Gaussian arena):

$$x'=\kappa x$$

with the new observation being $y=x'+v$. We have immediately that $$p(y|j,n_0,\kappa)=N(\kappa\mu^j(n_0),C^j(n_0)+\Sigma_v)$$

and $\kappa$ can be treated as a (positive-valued) random variable with prior pdf $p(\kappa)$, for example a discrete point-mass distribution gamma, inverted-gamma, or the square-root versions of these. The most natural choice would be the square-root inverted gamma distribution since it yields an analytic result that $p(x|j,n_0)$ is a multivariate Student distribution. We can now obtain a modified version of $p(y|j,n_0,\kappa)$ as with the new observation being $y=x'+v$. We have immediately that $$p(y|j,n_0)=\int N(\kappa\mu^j(n_0),\kappa^2 C^j(n_0)+\Sigma_v)p(\kappa)d\kappa$$

In the discrete point-mass case the integral will drop out straightforwardly as a finite summation of weighted Gaussian terms (a 'Gaussian mixture process'). In the continuous cases the integral can be approximated by a discrete summation or dealt with by more sophisticated computational tools such as Monte Carlo integration.

2. Classification Method

Classification of tapping position can then be achieved, for example, by Bayesian probabilities (classical or Maximum Likelihood would also work here):

$$p(j, n_0 \mid y) = \frac{p(y \mid j, n_0)p(j, n_0)}{p(y)}$$

where $p(y)$ could be computed as $\Sigma_{n_0,j} p(y|j,n_0)p(j,n_0)$ if required, but will not usually be necessary as it is constant for any given observed data y. $p(y)$ can however be used for selecting between different modelling specifications. See below for more detailed discussion of how to perform classification decisions using Bayesian decision theory and expected cost.

Multiple Components Method

The multiple component model proposed here is also a Gaussian process model, with the covariance function expressed in a reduced dimension. As such, these methods are strictly a subset of those in the previous section on more general Gaussian processes, although in the multiple components case we develop the mathematical formulae separately here. We are appealing here to dimensionality reduction arguments from Principal Components Analysis (PCA) and its random process interpretation through the Karhunen-Loeve Transform (KLT). Note that the extension to scale-mixture processes can be done in an exactly analogous fashion to that of the previous section.

1. Multiple Component Model

Consider the case where a particular tapping position $j \in \{1, 2, \ldots, J\}$ occurs at a time index $n_0$. A particular instance of a tap location j is modelled as a linear combination of one or more component waveforms $t_{i,m}{}^j$, of length $M^j$ elements, where i is the component number. In addition each tapping position has a fixed mean component vector $\mu^j$ associated with it, also of length $M^j$.

At this stage, consider the component waveforms as fixed and known. In practice, these will need to be pre-specified or learned from training data, see later information.

A particular tap occurs at a time index $n_0$, say, and we hence shift the component waveforms along to time $n_0$ and form a shifted vector of template components:

$$t_i^j(n_0)=[0 \ldots 0 t_{i,1}{}^j t_{i,2}{}^j \ldots t_{i,M_j}{}^j 0 \ldots 0]^T$$

such that the first non-zero element of $t_i^j(n_0)$ is at position $n_0$. Where the template component overshoots the end of the vector (i.e. when $n_0+M_j-1>N$, where N is the length of the current data record), the component vectors are truncated in the obvious way. $\mu^j$ is shifted to become $\mu^j(n_0)$ in a similar way.

We then assume a linear instantaneous model where a vector of time observations $y=[y_1, \ldots, y_N]^T$ are modelled as a noisy linear combination:

$$y = \sum_{i=1}^{I} \theta_i^j t_i^j(n_0) + \mu^j(n_0) + v, \quad (5)$$

where $t_i^j(n_0)$ is the i th template component out of a total of I components, shifted along to start at time $n_0$, $\theta_i^j$ is the amplitude of the i th component and $v=[v_1, \ldots, v_N]^T$.

Take $\theta_i^j$ to be a random variable, vectorised to $\Theta^j = [\theta_1^j, \ldots, \theta_I^j]^T$, describing the amplitude scale of each component i. $\Theta^j$ is then taken to be a Gaussian random vector:

$$p(\Theta^j|n_0,j) = N(\mu_\theta^j, \Sigma_\theta^j), \quad (6)$$

The noise v may be non-stationary, non-Gaussian, or both, and a heavy-tailed non-Gaussian background might be considered as a suitable option in noisy environments such as cafes where sudden loud noises are expected. However, for analytic tractability assume now that the noise background is a zero-mean Gaussian random vector:

$$v \sim N(0, \Sigma_v)$$

(non-zero mean can easily be incorporated as required).

The simplest assumption for the background noise interference is independent and Gaussian:

$$v_n \stackrel{i.i.d.}{\sim} N(0, \sigma_v^2). \quad (7)$$

and hence $\Sigma_v = \sigma_v^2 I_N$ where $I_N$ is the identity matrix of length N. It is straightforward to include a dependent Gaussian structure, such as an AR (auto-regression) or ARMA (auto-regression moving average) process, or a more general Gaussian process, in the mathematics, as desired, which would lead to non-identity forms for $\Sigma_v$.

At this stage, we assume that $\mu_\theta^j$, $\Sigma_\theta^j$ and $\Sigma_v$ are all pre-specified and known—in practice these would be obtained from prior reasoning or learned from training data.

Considering this model in matrix notation:

$$y = t^j(n_0)\Theta^j + \mu^j(n_0) + v. \quad (8)$$

where $$t^j(n_0) = [t_1^j(n_0) t_2^j(n_0) \ldots t_I^j(n_0)] \quad (9)$$

The likelihood function for the data is now readily obtained as:

$$p(y|j,n_0,\Theta^j) = N(t^j(n_0)\Theta^j + \mu^j(n_0), \Sigma_v) \quad (10)$$

We have specified here a fully Gaussian model for parameters and likelihood. This substantially simplifies calculations and is used in the example calculations below, but we note that a non-Gaussian model may prove even more successful in the classification task at hand and can in principle be incorporated into our framework.

2. Multiple Component Detector/Classifier

It is now possible to formulate a tap detector and classifier based on the above model. This could be done using classical detection theory, least squares-based fitting of the model, or Bayesian approaches. Here we focus on the latter Bayesian approaches for their simplicity and flexibility.

The Bayesian approach will compute the posterior tap probability:

$$p(j,n_0|y) \propto p(y|j,n_0)p(j,n_0) \quad (11)$$

$p(j,n_0|y)$ can be computed for all time-offsets $n_0$ and all tap positions j and optimised:

$$\hat{j}, \hat{n}_0 = \mathrm{argmax}_{j,n_0} p(j,n_0|y)$$

and $(\hat{j}, \hat{n}_0)$ taken as the MAP estimate of tapping position and tap identity.

Note that we will also wish to test the probability of the 'null' hypothesis, i.e. that there is just background noise present and no tap at all. We identify this hypothesis as the $j=0$ case. Since only noise is present, the likelihood is just the probability of the noise process, i.e in the Gaussian case:

$$p(y|j=0,n_0) = N(0,\Sigma_v)$$

$p(j,n_0)$ is the prior for tap identity and tap position. A naive version of this, used successfully in our work, assigns all tap identities as equally probable at all times:

$$p(j, n_0) = \begin{cases} \alpha \frac{1}{NJ}, & j > 0 \\ (1-\alpha)\frac{1}{N}, & j = 0 \end{cases}$$

where $\alpha$ is the probability that any tap has occurred in the time interval $1, \ldots, N$.

A more sophisticated version could incorporate that fact that some tap positions are more regularly used than others (e.g. common navigation functions), or the fact that there is temporal dependence between taps (if the previous tap was a particular type then the next tap is likely to be of another type, ...).

In practice the maximising value of $p(j,n_0|y)$ is monitored and a detection is only declared when $p(\hat{j},\hat{n}_0|y)$ exceeds a threshold. It will often be convenient to look at the ratio of posterior probabilities for each $j>0$, since this avoids any calculation of the normalisation constant in $p(j,n_0|y) \propto p(y|j, n_0)p(j,n_0)$ $$\frac{p(j, n_0|y)}{p(j=0, n_0|y)} = \frac{p(y|j, n_0)p(j, n_0)}{p(y|j=0, n_0)p(j=0, n_0)}$$

and we can then monitor this ratio (or more conveniently) its logarithm, declaring a detection whenever it exceeds a pre-specified threshold.

More generally, decision theory can be used to make the detection. If, for example, we are only interested in tap identity and not tap timing, we can compute instead:

$$\hat{j} = \mathrm{argmax}_j p(j|y) = \mathrm{argmax}_j \sum_{n_0=1}^{N} p(j, n_0|y)$$

Alternatively, we may work directly with a cost function that expresses the cost of particular classification errors, $C(\hat{j}, j)$ and choose our estimate to minimise the expected cost:

$$\hat{j}^{MR} = \mathrm{argmax}_j \sum_{j=1}^{J} C(\hat{j}, j)p(j|y)$$

The cost function could, for example, penalise false detections more than false alarms, and so forth.

Having described the general detection/classification framework, we now need to specify how to compute the marginal likelihood $p(y|j,n_0)$, as used for the posterior probability (11):

$$p(y|j,n_0) = \int_{\Theta^j} p(y,\Theta^j|j,n_0) d\Theta^j = \int_{\Theta^j} p(y|j,n_0,\Theta^j) p(\Theta^j|j,n_0) d\Theta^j$$

The two terms in the integrand have already been specified in (6) and (10). Since they are both Gaussian we can perform this integral using standard Gaussian integral identities:

$$p(y|j,n_0,\Theta^j)p(\Theta^j|j,n_0) = N\left(y\left|t^j(n_0)\Theta^j + \mu^j(n_0), \sum_v\right.\right) N\left(\Theta^j\left|\mu_\Theta^j, \sum_\Theta^j\right.\right) =$$

$$\frac{1}{(2\pi)^{J/2}\left|\sum_\Theta\right|^{1/2}(2\pi)^{N/2}\left|\sum_v\right|^{1/2}} \exp\left(-\frac{1}{2}\left((\Theta^j-\mu_\Theta^j)^T \sum_\Theta^{-1}(\Theta^j-\mu_\Theta^j)\right) + \right.$$

$$\left. (y-\mu^j(n_0)-t^j(n_0)\Theta^j)^T \sum_v^{-1}(y-u^j(n_0)-t^j(n_0)\Theta^j)\right)$$

(In the notation used, for clarity vectors/matrices are not always bolded and some superscripts/subscripts are omitted for clarity, eg j and $n_0$ for t). Rearranging the exponent, we have:

$$\left((\Theta^j-\mu_\Theta^j)^T \sum_\Theta^{-1}(\Theta^j-\mu_\Theta^j)\right) +$$

$$(y-\mu^j(n_0)-t^j(n_0)\Theta^j)^T \sum_v^{-1}(y-u^j(n_0)-t^j(n_0)\Theta^j) =$$

$$(\Theta^j-\hat{\Theta}^j)^T \Phi(\Theta^j-\hat{\Theta}^j) - \beta^T\hat{\Theta}^j + \mu_\Theta^{jT}\sum_\Theta^{-1}\mu_\Theta^j +$$

$$(y-\mu^j(n_0))^T \sum_v^{-1}(y-\mu^j(n_0))$$

where: $\beta = \sum_\Theta^{-1}\mu_\Theta^j + t^j(n_0)^T \sum_v^{-1}(y-\mu^j(n_0))$ $$\Phi = \left(\sum_\Theta^{-1} + t^j(n_0)^T \sum_v^{-1} t^j(n_0)\right)$$

$$\hat{\Theta}^j = \Phi^{-1}\beta$$

Hence the integral is given by:

$$p(y|j,n_0) = \frac{1}{\left(\left|\sum_\Theta\right|\right)^{1/2}(2\pi)^{N/2}\left(\left|\sum_v\right|\right)^{1/2}|\Phi|^{1/2}}$$

$$\exp\left(-\frac{1}{2}\left(-\beta^T\Phi^{-1}\beta + \mu_\Theta^{jT}\sum_\Theta^{-1}\mu_\Theta^j + (y-\mu^j(n_0))^T \sum_v^{-1}(y-\mu^j(n_0))\right)\right)$$

For posterior probability ratios we require the ratio of this likelihood to the 'null' j=0 likelihood, since we have for the ratio:

$$\frac{p(j,n_0|y)}{p(j=0,n_0|y)} = \frac{p(y|j,n_0)p(j,n_0)}{p(y|j=0,n_0)p(j=0,n_0)}$$

This Ratio simplifies the above expression somewhat:

$$\frac{p(y|j,n_0)}{p(y|j=0,n_0)} = \frac{1}{\left|\sum_\Theta\right|^{1/2}|\Phi|^{1/2}}$$

$$\exp\left(-\frac{1}{2}\left(-\beta^T\Phi^{-1}\beta + \mu_\Theta^{jT}\sum_\Theta^{-1}\mu_\Theta^j - 2y^T\sum_v^{-1}\mu^j(n_0) + \mu^j(n_0)^T\sum_v^{-1}\mu^j(n_0)\right)\right)$$

This is the general form of the result. Substantial simplifications arise from various useful special cases. In particular, consider the white noise case with $\Sigma_v = \text{diag}(\sigma_v^2)$ and the case of orthogonal components where $t^j(n_0)^T t^j(n_0) = I_J$. Then:

$$\beta = \sum_\Theta^{-1}\mu_\Theta^j + \frac{1}{\sigma_v^2} t^j(n_0)^T (y-\mu^j(n_0))$$

$$\Phi = \left(\sum_\Theta^{-1} + \frac{1}{\sigma_v^2} I_l\right)$$

$$\hat{\Theta}^j = \Phi^{-1}\beta$$

Note in particular that the term $t^j(n_0)^T y$ can be computed for all $n_0$ by a simple FIR filtering operation on y with coefficients given by the template component vector $t_i^j$ (reversed in time ordering). Similarly, the data dependent terms in $(y-\mu^j(n_0))^T \Sigma_v^{-1}(y-\mu^j(n_0))$ can be computed by simple summing operations and a further filtering operation on y with coefficients $\mu^j$. Remaining terms can be precomputed and stored in advance of receiving the data.

Moreover, if the prior covariance matrix for $\Theta^j$ is diagonal, $\Sigma_\Theta^j = \text{diag}(\sigma_{\Theta_1}^{j^2}, \ldots, \sigma_{\Theta_l}^{j^2})$ and the prior mean vector is zero, we have further simplifications in form.

Consider now a case with $\mu_\Theta^j = 0$, in order to give a concrete example of the simplest computations that could be involved in the classfication process.

Look first at β:

$$\beta = \sum_\Theta^{-1}\mu_\Theta^j + \frac{1}{\sigma_v^2} t^j(n_0)^T (y-\mu^j(n_0))$$

$$= \frac{1}{\sigma_v^2}\left(t^j(n_0)^T y - t^j(n_0)^T \mu^j(n_0)\right)$$

$$= \frac{1}{\sigma_v^2}(\text{FILTERYWITHT}^j(n_0) - \text{TMU}^j)$$

where 'FILTERYWITHT' is implemented for all values of $n_0$ and j as a simple bank of J FIR filters applied to the data y, each filter having coefficients equal to one of the (time-reversed) component waveforms for tapping position j, and where $\text{TMU}^j = t^j(n_0)^T \mu^j(n_0) = t^{jT}\mu^j$ is a constant vector for each tapping position which may be computed off-line and stored prior to running in use mode.

Then, $\Phi$ is a diagonal matrix:

$$\Phi = \left(\sum_{\Theta}^{j-1} + \frac{1}{\sigma_v^2} I_I\right)$$

$$= \text{diag}\left(\frac{\sigma_v^2 + \sigma_{\Theta_1}^{j2}}{\sigma_v^2 \sigma_{\Theta_1}^{j2}}, \ldots, \frac{\sigma_v^2 + \sigma_{\Theta_I}^{j2}}{\sigma_v^2 \sigma_{\Theta_I}^{j2}}\right)$$

and hence the inverse of $\Phi$ is just $$\Phi^{-1} = \text{diag}\left(\frac{\sigma_v^2 \sigma_{\Theta_1}^{j2}}{\sigma_v^2 + \sigma_{\Theta_1}^{j2}}, \ldots, \frac{\sigma_v^2 \sigma_{\Theta_I}^{j2}}{\sigma_v^2 + \sigma_{\Theta_I}^{j2}}\right)$$

Then, $\hat{\Theta}^j$ is obtained as a simple summation of terms:

$$\hat{\Theta}^j = \sum_{i=1}^{I} \frac{\sigma_{\theta_i}^{j2}}{\sigma_v^2 + \sigma_{\Theta_i}^{j2}} (\text{FILTERYWITHT}_i^j(n_0) - \text{TMU}_i^j)$$

where the subscript i refers as before to the i th waveform component at tapping position j.

Now, looking at the final expression for probability ratio we require:

$$\beta^T \Phi^{-1} \beta = \sum_{i=1}^{I} \beta_i \hat{\Theta}_i^j$$

$$\mu_\Theta^{j T} \sum_{\Theta}^{j-1} \mu_\Theta^j = 0, \text{ (since } \mu_\Theta^j = 0 \text{ here)}$$

$$y^T \sum_v^{-1} \mu^j(n_0) = \frac{1}{\sigma_v^2} \text{FILTERYWITHMU}^j(n_0)$$

where as before 'FILTERYWITHMU' is implemented for all $n_0$ and a particular j as an FIR filter operation applied to the data y, with coefficients equal this time to the (time-reversed) process mean vector $\mu^j$. Finally, the matrix determinant terms simplify to:

$$|\Sigma_\Theta|^{1/2} |\Phi|^{1/2} = \prod_{i=1}^{I} \frac{\sigma_v}{\sqrt{\sigma_v^2 + \sigma_{\Theta_i}^{j2}}}$$

Putting the whole thing together now into the steps for classification of a data sequence y, and highlighting the parts that can be pre-computed and stored, we have:
Start of Algorithm:
  Pre-trained/computed and stored in NVRAM for j=1:J
    $t^j$ N by I—dimensional array
    $\mu^j$ N—dimensional array
    $\sigma_\Theta^j$, (I—dimensional array containing elements $\sigma_{Theta_i}^j$)
    LOGPRIORRRATIO=log($\alpha$)–log(1–$\alpha$)–log(J)
    TMU$^j$=$t^{jT}\mu^j$
    MUTMU=$\mu^{jT}\mu^j$, scalar variable)

For each chunk of data y, of length N time samples:
Determine background noise variance [this is the simplest version—just assume that background noise variance equals received signal energy]:

$$\sigma_v^2 = \frac{1}{N} \sum_{n=1}^{N} y_n^2$$

For j=1:J
Compute 'FILTERYWITHT':
For i=1:I
Apply an FIR filter to the data y, the filter having coefficients equal to the corresponding (time-reversed) component waveform for tapping position j and component i, i.e. the time-reversed version of $t_i^j$. The output is an N-dimensional vector FILTERYWITHT$_i^j$ for a particular value of j and i, and for all values of $n_0$=1:N.
End
Compute 'FILTERYWITHMU':
Apply an FIR filter to the data y, the filter having coefficients equal to the corresponding (time-reversed) mean process vector for tapping position j, i.e. the time-reversed version of $\mu^j$. The output is an N-dimensional vector FILTERYWITH$^j$ for a particular value of j, and for all values of $n_0$=1:N.
For $n_0$=1:N
  Calculate $\beta$, a vector of length I:

$$\text{BETA} = \frac{1}{\sigma_v^2} (\text{FILTERYWITHT}^j(n_0) - \text{TMU}^j)$$

Compute $\hat{\Theta}^j$, a vector of length I:

$$\text{THETA} = \sum_{i=1}^{I} \frac{\sigma_{\Theta_i}^{j2}}{\sigma_v^2 + \sigma_{\Theta_i}^{j2}} (\text{FILTERYWITHT}_i^j(n_0) - \text{TMU}_i^j)$$

Compute:

$$\text{BETAPHIBETA} = \sum_{i=1}^{I} \text{BETA}_i \text{THETA}_i^j$$

$$\text{YTSIGMAVMU} = \frac{1}{\sigma_v^2} \text{FILTERYWITHMU}^j(n_0)$$

$$\text{DETSIGTHETAPHI} = \prod_{i=1}^{I} \frac{\sigma_v}{\sqrt{\sigma_v^2 + \sigma_{\Theta_i}^{j2}}}$$

Compute log-likelihood ratio:

LOGLIKERATIO=–log(DETSIGTHETAPHI)–½(–BETAPHIBETA–2×YTSIGMAVMU+MUTMU/$\sigma_v^2$)

Compute Bayesian log-posterior probability ratio and store in as an N by J-dimensional array in RAM:

LOGPOSTRATIO$_{n_0}^j$=LOGLIKERATIO+LOGPRI-
ORRATIO                                                                                  (14)

End

End

Find indices $\hat{n}_0$, $\hat{j}$, of maximum element of array LOGPOSTRATIO. If this maximum exceeds a fixed threshold, return $\hat{j}$ as the detected tap position and $n_0$ as the detected tap time. Otherwise, return 'no tap detected'.

End of Algorithm

A special case of the above has I=1. Then the models reduce to a type of Bayesian matched filter/correlation detector.

3. Training the Multiple Component Model

Several components of the model were assumed known in the last section, specifically $t^j$, $\Sigma_\Theta^j$, $\mu_\Theta^j$, $\mu^j$ and $\sigma_v$. These can all be learned from labelled training data, in which a user is prompted to tap one or more times (possibly many more than one) in all J specified tapping positions, according to some known deterministic or random pattern of positions, and possibly in a variety of tapping styles and environments. The parameters of the classification model are then learned.

In one realisation of the training, the templates are drawn from a known dictionary of components, such as a wavelet, Fourier or Gabor dictionary. In this case the training algorithm will learn which elements of the specified dictionary should be used in the model, and also learn the prior distribution of the coefficients, i.e. the $\mu_\Theta$ and $\Sigma_\Theta$ terms. The dictionary elements and their parameters can for example be learned using pursuit methods, or sparse Bayesian/likelihood modelling methods.

In another realisation, the template component vectors are automatically learned from the data, including their number. Sophisticated approaches based on independent component analysis and probability modelling are possible here, and would not necessarily deliver orthogonal components. A simple and successful approach however involved performing a Principal Components Analysis (PCA) on the aligned training data. This comprises a detection and alignment phase in which the training examples are all aligned in time using correlation matching or similar, and then orthogonal component vectors are computed by PCA for each tapping position. This is achieved by first subtracting the overall mean of the aligned training examples. This is then used as $\mu^j$ in the above detection procedure. Then the sample correlation matrix is obtained from the mean-corrected, aligned training data—both can be achieved as described in the section on Gaussian Processes. An eigenvector/eigenvalue decompostion is then applied to the sample correlation matrix.

The most significant eigenvalues of the correlation matrix are then used as the $\sigma_{\Theta_i}^{j^2}$ in the detection model. A threshold is used to determine the number of significant components to retain, i.e. the number of components I, which may be different for each tapping position. The corresponding eigenvectors then form the orthogonal set of template components $t_i^j$. This procedure is repeated for each tapping position j, returning different template components and variances for each j.

In a refinement of the above paragraph, the learned template components are then used with the training data to form better estimates of the prior parameters $\Sigma_{\Theta_i}^j$, and possibly to learn non-zero values for the mean parameters $\mu_\Theta^j$.

In a further refinement the template vectors themselves are also refined, starting with the PCA vectors as an initialiser. The refined component vectors may or may not be orthogonal, depending on the details of the procedure.

In the above approach, a separate set of template components and prior parameters is learned for each tapping position. In another version of our approach, a common set of template components is learned from the whole unlabelled training dataset, using the above PCA approach, or a more sophisticated approach such as probability modelling. Then, using these template components, separate prior parameters are learned for each tapping position, including most likely non-zero mean terms $\mu_\Theta^j$. as well as possibly fully populated covariance matrix $\Sigma_{\Theta_i}^j$ In another version of the above, additional training data is obtained from many randomised tapping positions on the device, not generally coinciding with the tapping positions being currently trained. Template components are then learned by e.g. PCA from this entire randomised training set, and these templates are used for determining the prior parameters for labelled training data from the current training grid. This approach should lead to greater robustness to tapping variations, especially when detecting 'off-grid' taps (see later).

4. Background Modelling

The background noise parameter $\sigma_v^2$ may be learned automatically from new data as it is received. In the simplest version we simply set $\sigma_v^2$ equal to the mean-squared value of the current data y. This leads to a conservative overestimate for the noise. In more refined versions outlier and spike removal are first employed in order to get a more reliable noise estimate.

More generally, a correlated noise model may be estimated and incorporated directly through the noise covariance matrix $\Sigma_v$. This may be obtained by estimating the parameters of a corresponding autoregressive (AR) or autoregressive moving-average (ARMA) model from the data and computing the corresponding covariance matrix. As above, robust estimation methods can be used to reduce the impact of the tap transients on the estimates. Ideally, a short section of data just before and/or after a candidate tap pulse would be used for this estimation. More generally, a Gaussian Process background model can be incorporated in a similar way.

5. Preconditioning of Data

It has been found beneficial to apply a high-pass filter to training and test data prior to training classification. This makes the algorithms much more robust in the presence of heavy background noise such as planes or trains or cars.

6. Adaptation of Templates with Time

It is proposed to use good pulse detections over time to slowly adapt the template and prior model parameters. This is in anticipation of slow changes to the physical characteristics of the device over time.

7. Detection of Off-Grid Taps

The algorithms can be extended to classify taps that do not lie exactly on the training grid.

This is important for devices where menu grids change during navigation, e.g. web browsing. In a simple version of this, templates and components are 'interpolated' to give new templates/components at new off-grid tapping positions and classification proceeds using these new templates at the new grid positions. This allows a continuous coverage of the whole screen in principle—ie. not grid-based at all.

8. Multiple Microphones

All of the above have multiple microphone extensions that could perform better.

9. Low Complexity Detection Stage

Computation can be substantially reduced by running a low-complexity matched or correlation detector to find candidate tap positions. This would involve running one or at most a few FIR filters on the data, with coefficients based on e.g. a mean template from a large unlabelled training set. Even more can be saved by first running a short term energy detector and only trying the correlation detector once a high energy region is detected. Only when a strong candidate detection and alignment has been made is the full component-based detector be called into play. This substantially reduces computational burden.

Implementation of Some Preferred Embodiments

In this embodiment we use the multi-component Gaussian model. Training is done by PCA analysis of the labelled training data.

1. Training

A large quantity of labelled training data is digitally recorded from the acoustic sensor on the device and transferred onto a PC via an analogue or digital link. Here labelling means that we record which spot is being tapped along with the audio waveform itself. This will involve tapping many times at each spot located on the device. Tapping may be carried out using different styli, fingernail, fingerpad, different tapping strengths and styles, different handholds, different users, different environmental temperatures and indeed different examples of the same type of device (e.g. multiple handsets of the same model). This process is typically carried out once for each batch of handsets in the factory or in the laboratory, although it could be repeated later on in the life of the device.

Figure 1:
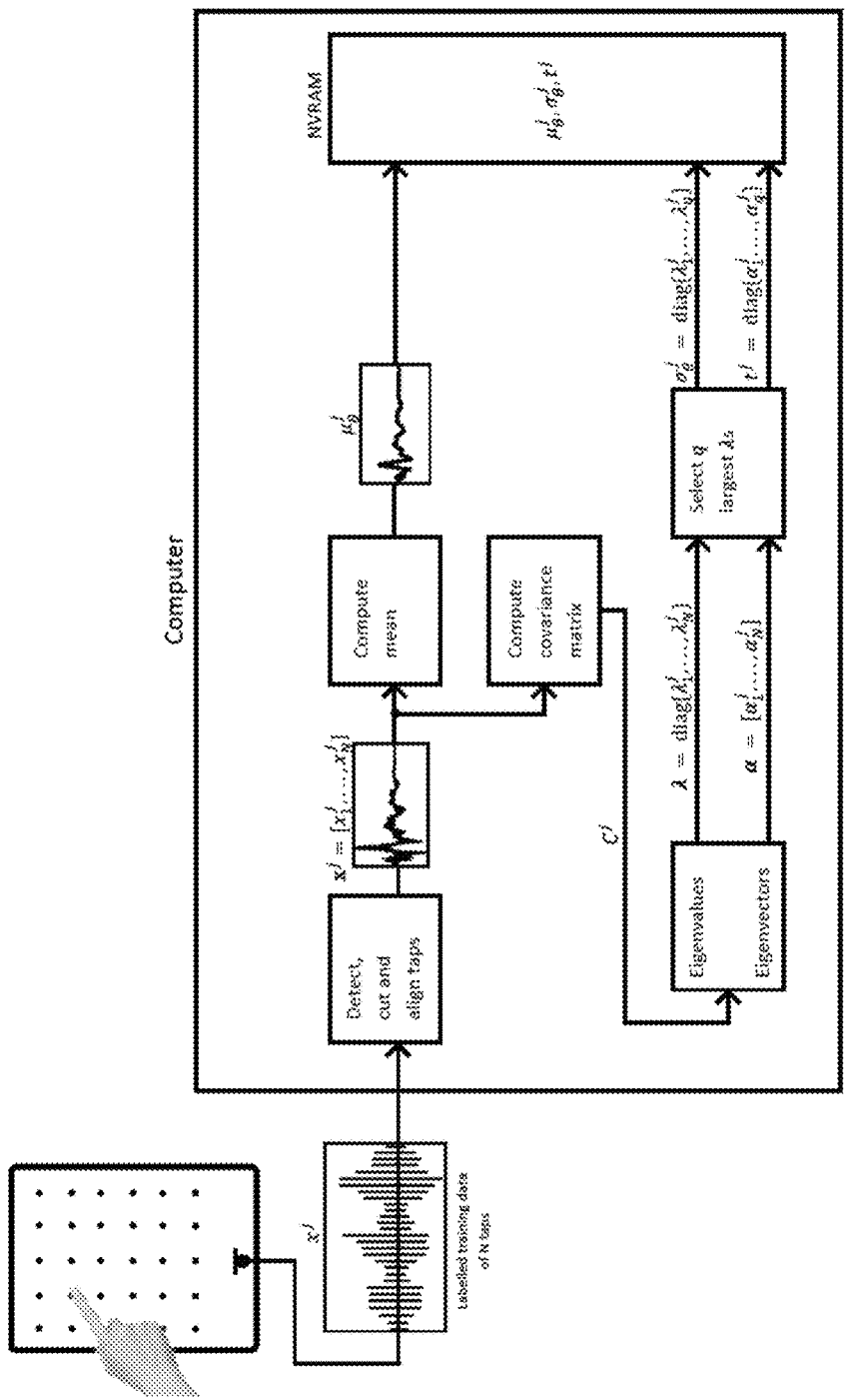
FIG. 1 shows a block diagram of a computer system configured to implement a tap-sensing training procedure according to an embodiment of an aspect of the invention.
Figure 3:
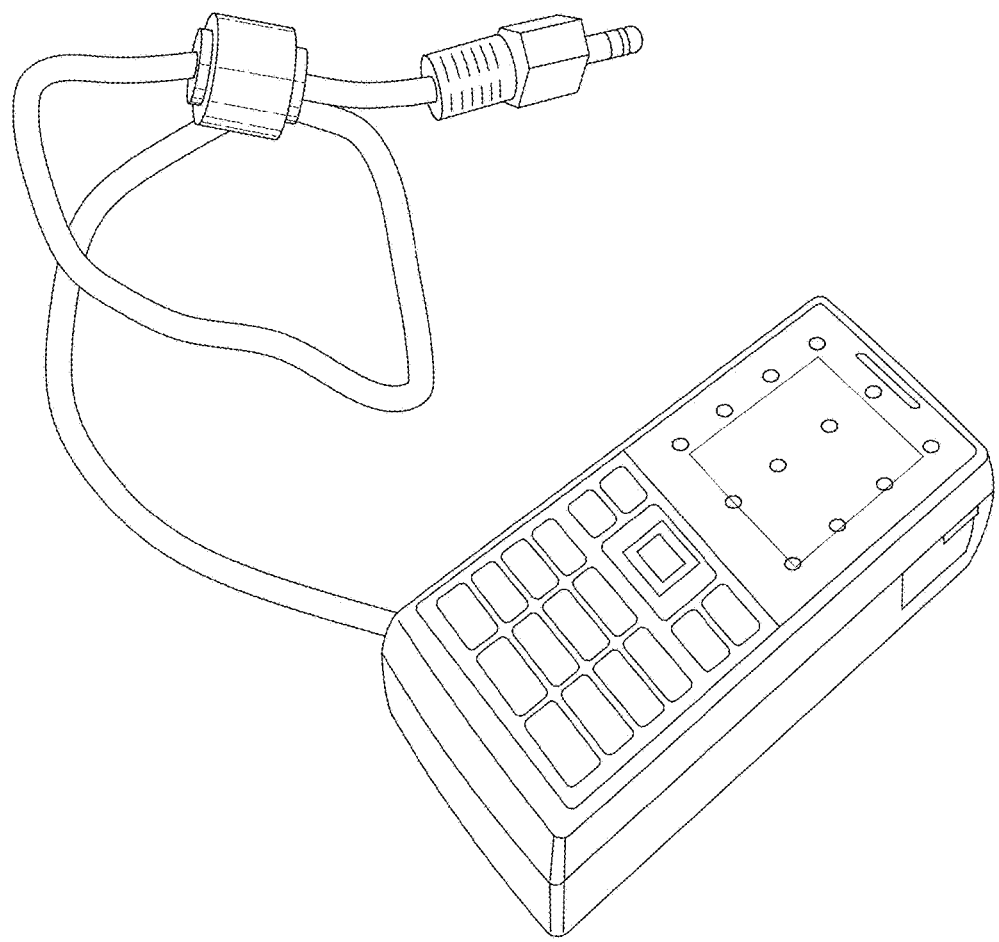
FIG. 3 shows an example of a mobile phone in which the internal microphone has been provided with a connection to enable the capture and processing of labelled training data for determining statistical data to enable the device to be configured to be tap-sensitive according to an embodiment of the invention.
Figure 4:
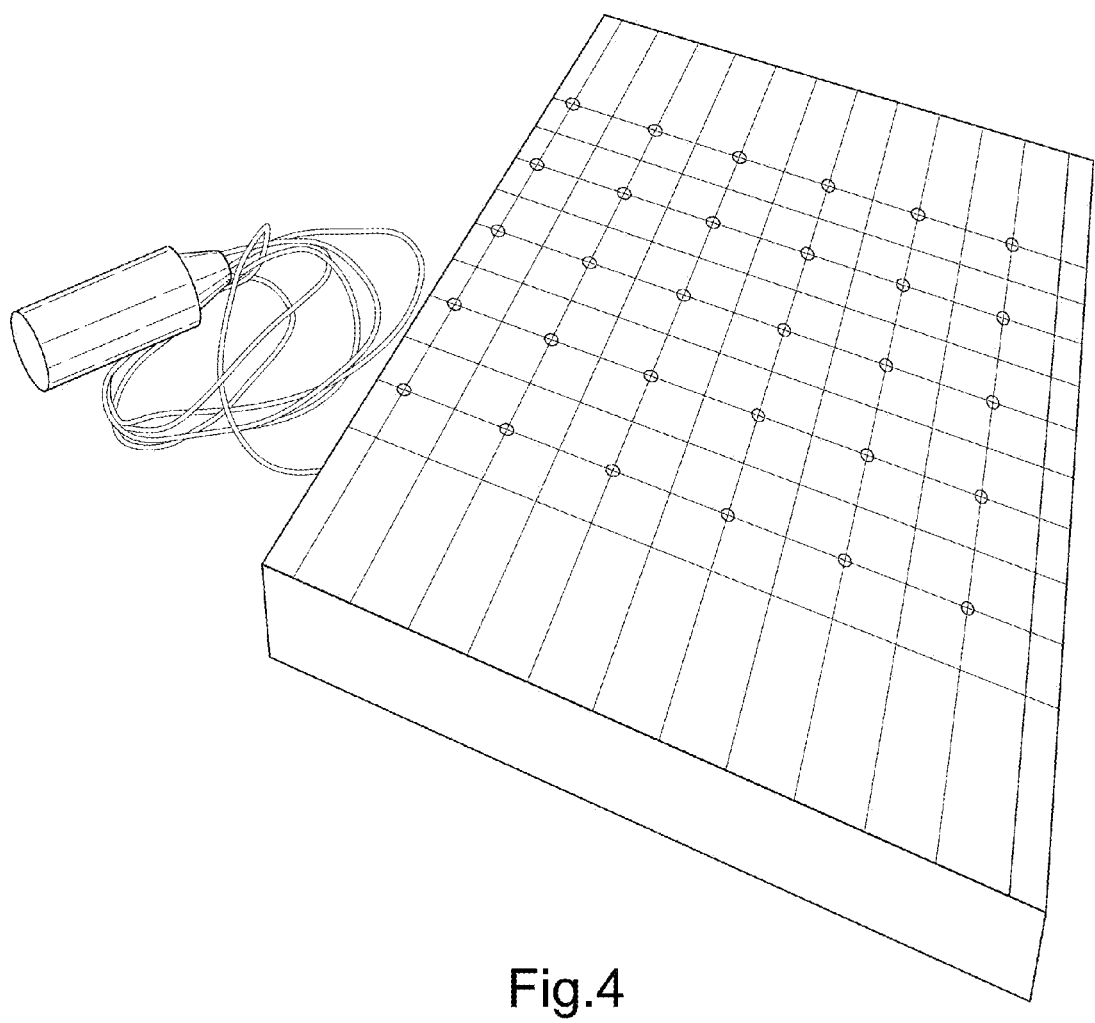
FIG. 4 shows an example of a wooden board object with a microphone attached to the back to enable capture and processing of labelled training data so that the device can be configured to provide a grid of tap-sensitive regions as illustrated.

FIG. 1 shows a block diagram of a computer system configured to implement this method. FIGS. 3 and 5 show use of an internal microphone of a mobile phone to capture training data, FIG. 4 shows a microphone-equipped inert object.

In more detail, FIG. 1 shows a block diagram of the implementation of the training algorithm. The training data $x^j$ is acquired by the user tapping multiple times on a specific spot i. The N taps in this data stream $x^j$ is then detected and aligned with each other as an ensemble in a matrix. FIG. 1 shows this as $x^j=[x_1^j, x_2^j, \ldots, x_N^j]$ and as the N taps superimposed on each other in the little plot. From the ensemble the mean $\mu^j$ and the covariance matrix $C^j$ is computed, and from the covariance matrix $C^j$ the eigenvalues and eigenvectors are derived. The q largest eigenvalues are selected and the corresponding eigenvectors are stored as the templates $t^j=[\alpha_1^j, \alpha_2^j, \ldots, \alpha_q^j]$ while the eigenvectors are stored as $\sigma_\theta^i=\text{diag}\{\lambda_1^j, \lambda_2^j, \ldots, \lambda_q^j\}$.

Figure 6:
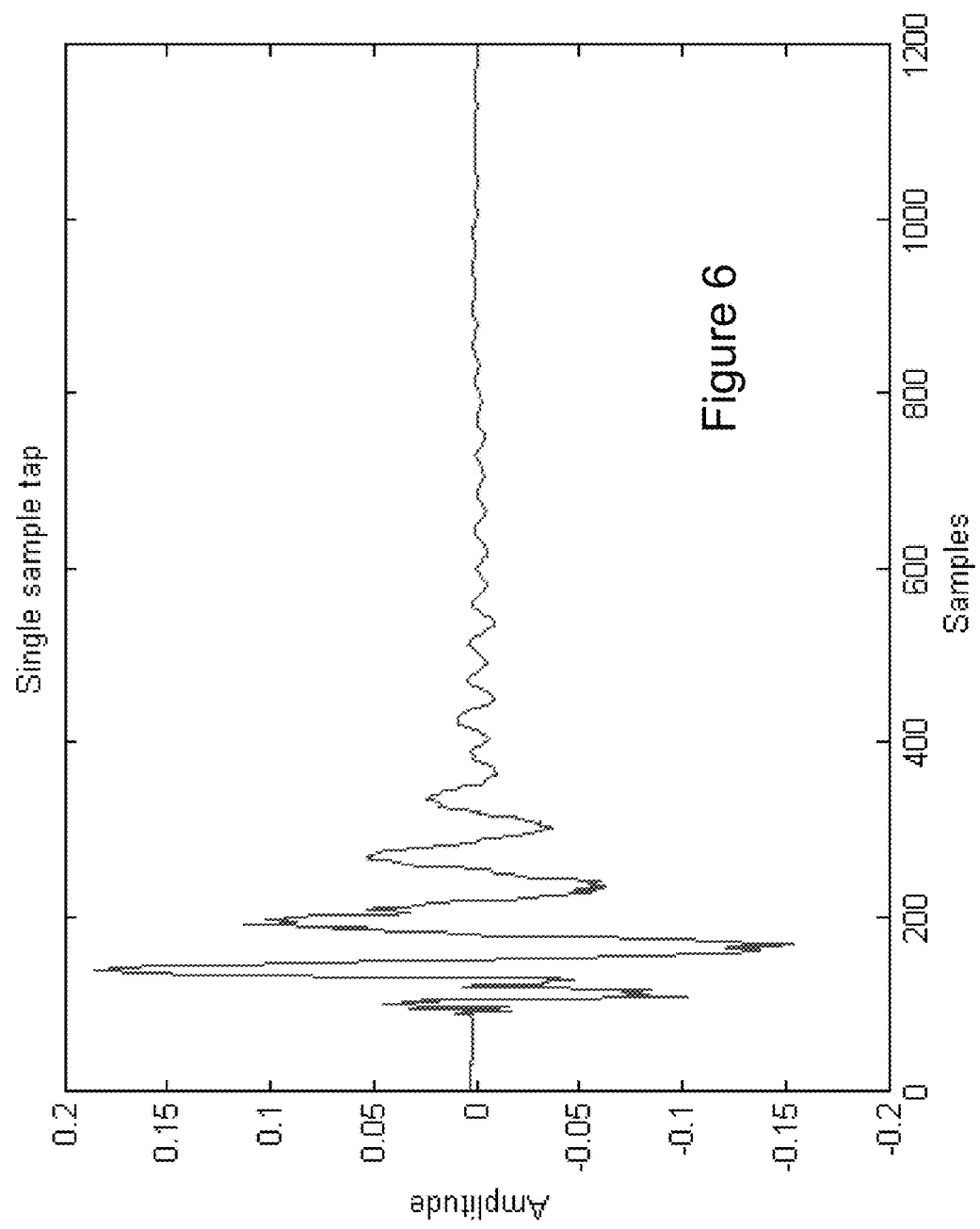
FIG. 6 shows an example of a captured acoustic waveform of a single tap.
Figure 7:
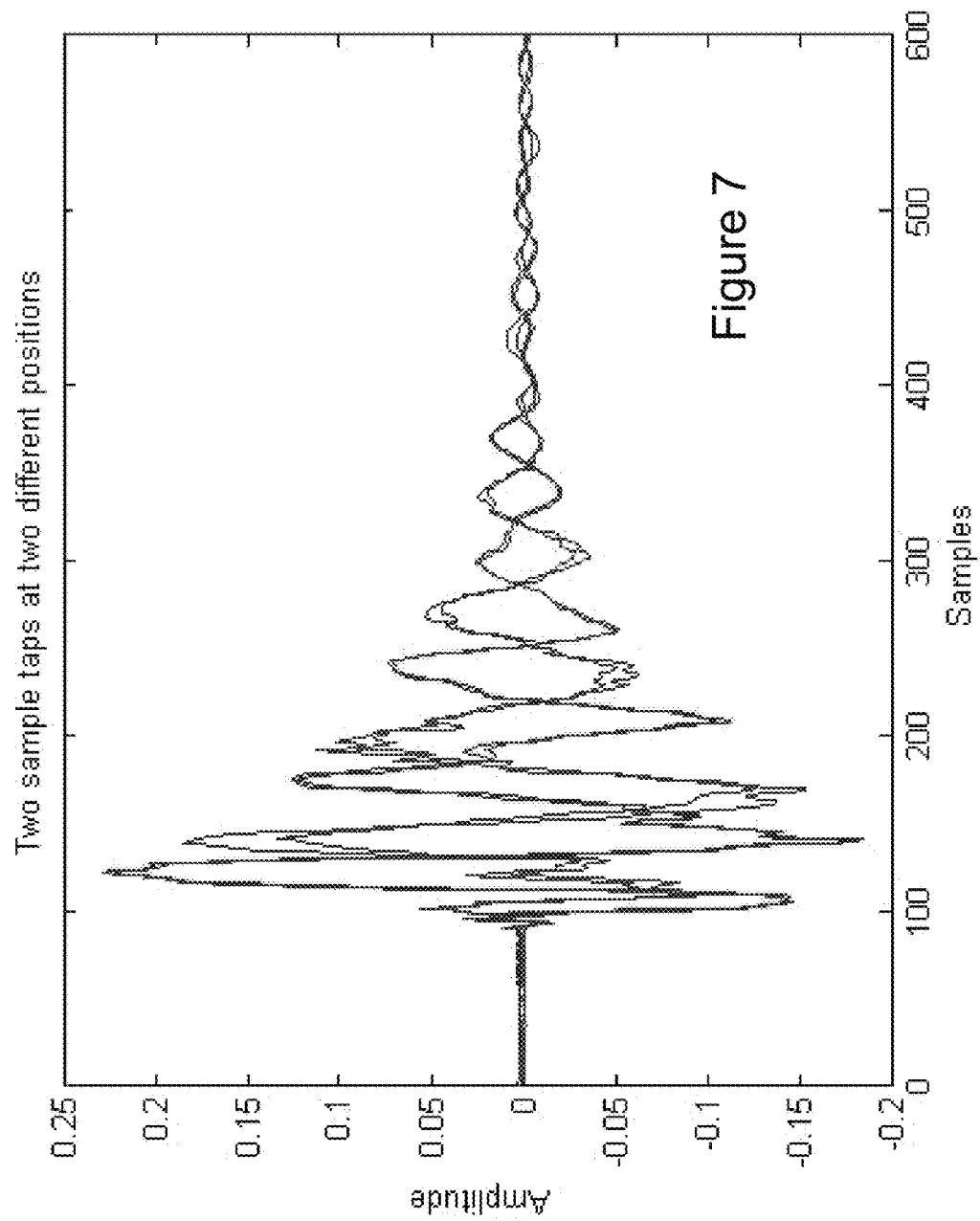
FIG. 7 shows examples of waveforms from two taps on each of two different spots.
Figure 9:
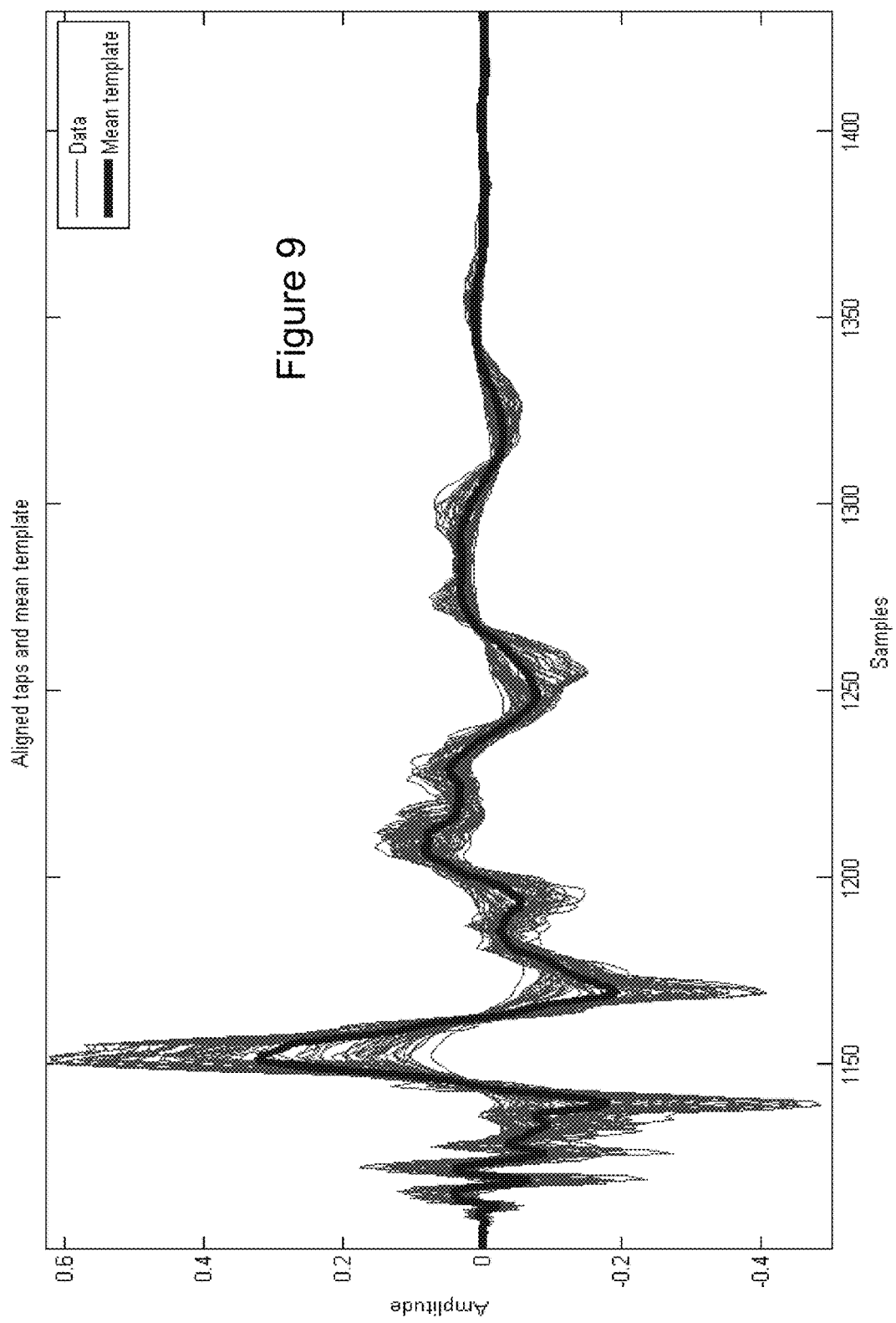
FIG. 9 shows an example of a set of training data waveforms captured from a single tap-sensitive region, after time-alignment showing a mean value (thick line) and variability of the waveforms (thin lines)

For each tapping position, a single waveform corresponding to one representative tap is selected (by visual examination of the training data in an audio editor). This waveform is trimmed and used as the coefficients in a correlation detector which determines the alignment of all training taps from this tapping position. These aligned taps are then extracted, trimmed to the same length (typically around 0.005 s long) and training of template components is carried out. FIG. 6 shows an example of a waveform from a single tap, and FIG. 7 two tap waveforms from each of two tap positions. FIG. 9 shows example of time-aligned waveforms from a single tap-sensitive region showing the mean (thick line) and also the variability of these waveforms.

First the mean and covariance functions are computed:

$$\hat{\mu}^j = \frac{1}{N^j}\sum_k x_k^j$$

$$\hat{C}^j = \frac{1}{N^j}\sum_k (x_k^j - \hat{\mu}^j)(x_k^j - \hat{\mu}^j)^T$$

Figure 10:
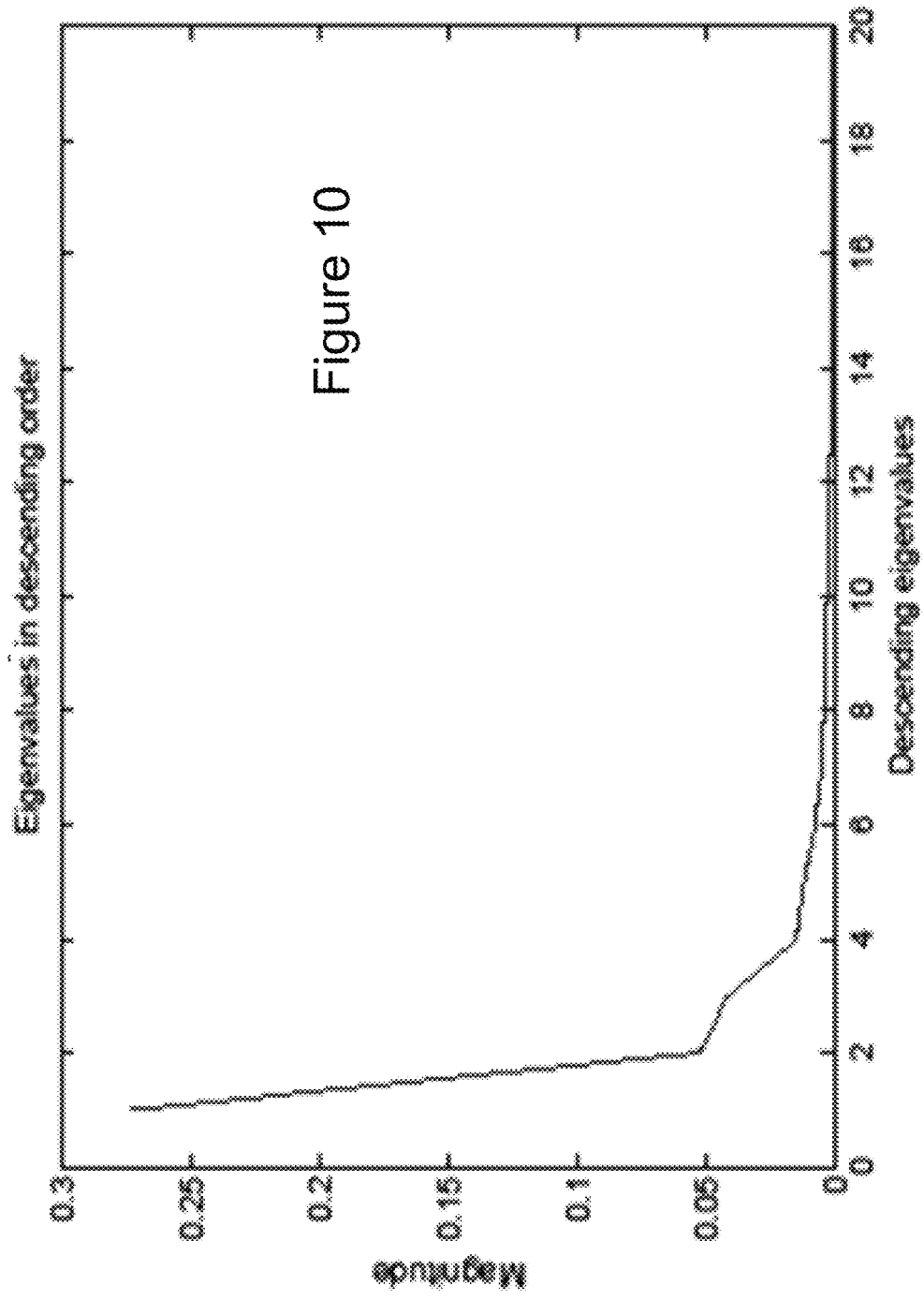
FIG. 10 shows output data from a decomposition of a covariance matrix of a set of waveforms of the type illustrated in FIG. 9, showing a decomposition of the covariance into a set of eigenvalues and corresponding eigenvectors, showing, in this example, that after four or five components the eigenvalues of the basis functions are below a threshold and may be neglected.
Figure 12:
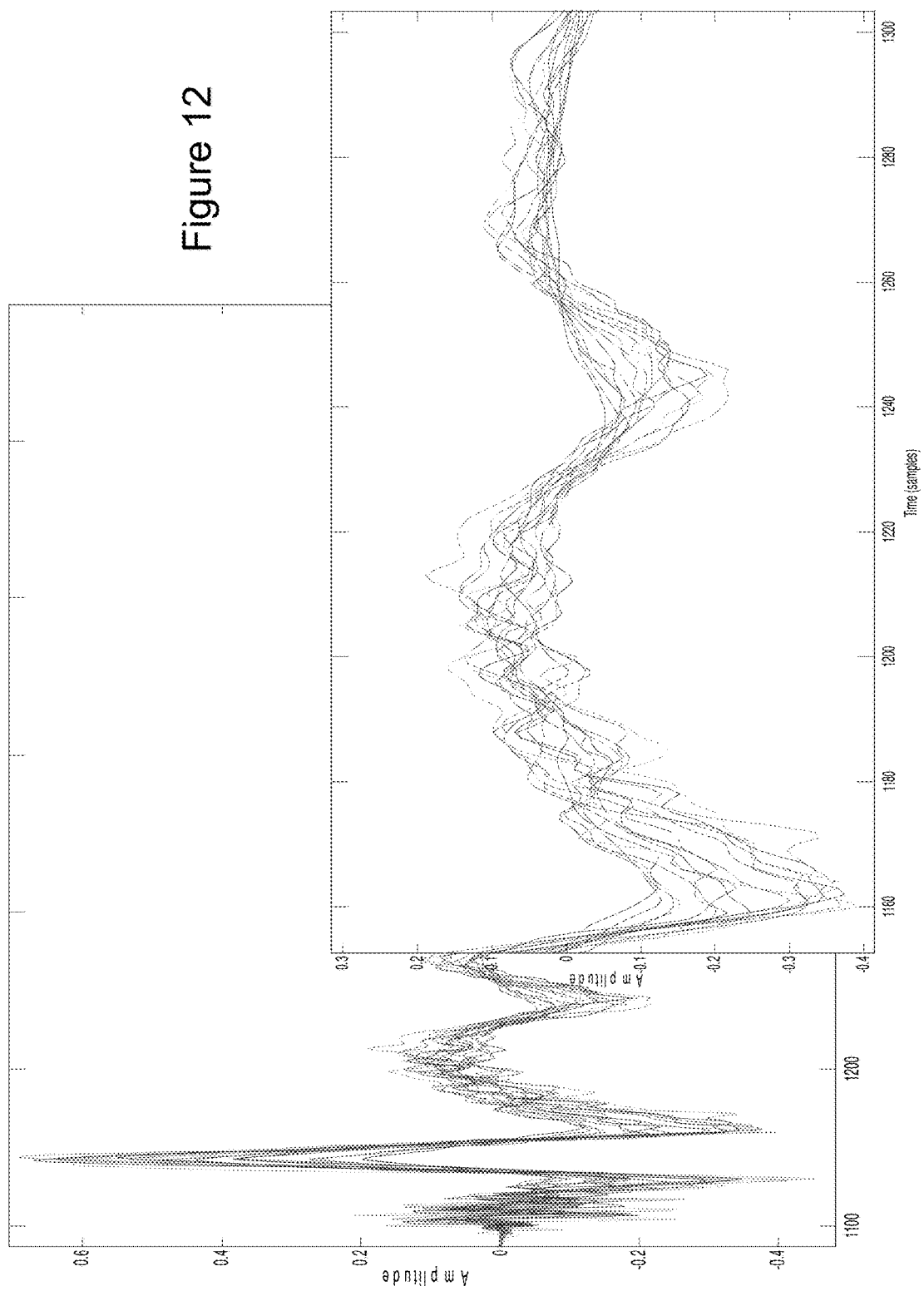
FIG. 12 illustrates variability in the basis functions (ie templates/components) for a tapped region.

Then the eigenvectors and eigenvalues of $\hat{C}^j$ are computed. The eigenvalues are then sorted by decreasing magnitude and a number of components to use is selected on the basis of how these decay towards zero. FIG. 10 shows the decay of eigenvalues with component number, from a decomposed covariance matrix. FIG. 12 indicates basis function (template) variability.

The template components are then set equal to the eigenvectors which correspond to the highest eigenvalues, while the prior variances $\sigma_{\theta_i}^j$ are set equal to the corresponding eigenvalues. In this embodiment the prior means are all then set to zero $\mu_\Theta^j = 0$.

Thus the training process yields the prior parameters for each tapping position, $\Sigma_\Theta^j = \text{diag}(\sigma_{\Theta_1}^j, \ldots, \sigma_{\Theta_i}^j)$ and the mean vectors $\mu_\Theta^j[=0$ here].

2. Testing/Use Mode

In the use mode, audio is continuously recorded from the device. In the simplest version of the approach, this audio is then split up into chunks or frames of around 0.05 s and each chunk is separately analysed to determine whether a tap has occurred and if so where the user tapped. (In more sophisticated implementations the data may be input sample by sample and classifications are updated on-line on a sample by sample basis—both versions fit with the above detailed mathematical framework).

For each chunk of data y, of length N samples (where N is, say, of order 1000), loop over possible tap times $n_0$ and tapping positions j:

Determine background noise variance (this is the simplest version—just assume that background noise variance equals received signal energy):

$$\sigma_v^2 = \frac{1}{N}\sum_{n=1}^N y_n^2$$

For j=1:J
For $n_0$=1:N
Compute likelihood-ratio function:

$$\beta = \sum_\Theta^{j-1} \mu_\Theta^j + \frac{1}{\sigma_v^2}t^j(n_0)^T(y - \mu^j(n_0))$$

$$\Phi = \left(\sum_\Theta^{j-1} + \frac{1}{\sigma_v^2}I_l\right)$$

$$\hat{\Theta}^j = \Phi^{-1}\beta$$

$$\frac{p(y \mid j, n_0)}{p(y \mid j=0, n_0)} = \frac{1}{|\Sigma_\Theta|^{1/2}|\Phi|^{1/2}}$$

$$\exp\left(-\frac{1}{2}\left(-\beta^T\Phi^{-1}\beta + \mu_\Theta^{j^T}\sum_\Theta^{j-1}\mu_\Theta^j - 2y^T\Sigma_v^{-1}\mu^j(n_0) + \mu^j(n_0)^T\sum_v^{-1}\mu^j(n_0)\right)\right)$$

Compute Bayesian posterior probability ratio $$\frac{p(j, n_0 \mid y)}{p(j=0, n_0 \mid y)} = \frac{p(y \mid j, n_0) p(j, n_0)}{p(y \mid j=0, n_0) p(j=0, n_0)} \quad (1)$$

End
End
Find maximum of $$\frac{p(j, n_0 \mid y)}{p(j=0, n_0 \mid y)}$$

over all j>0 and $n_0$. If the maximum exceeds a fixed threshold, return that detected j and $n_0$ pair. Otherwise, return no detection (j=0).

Figure 2:
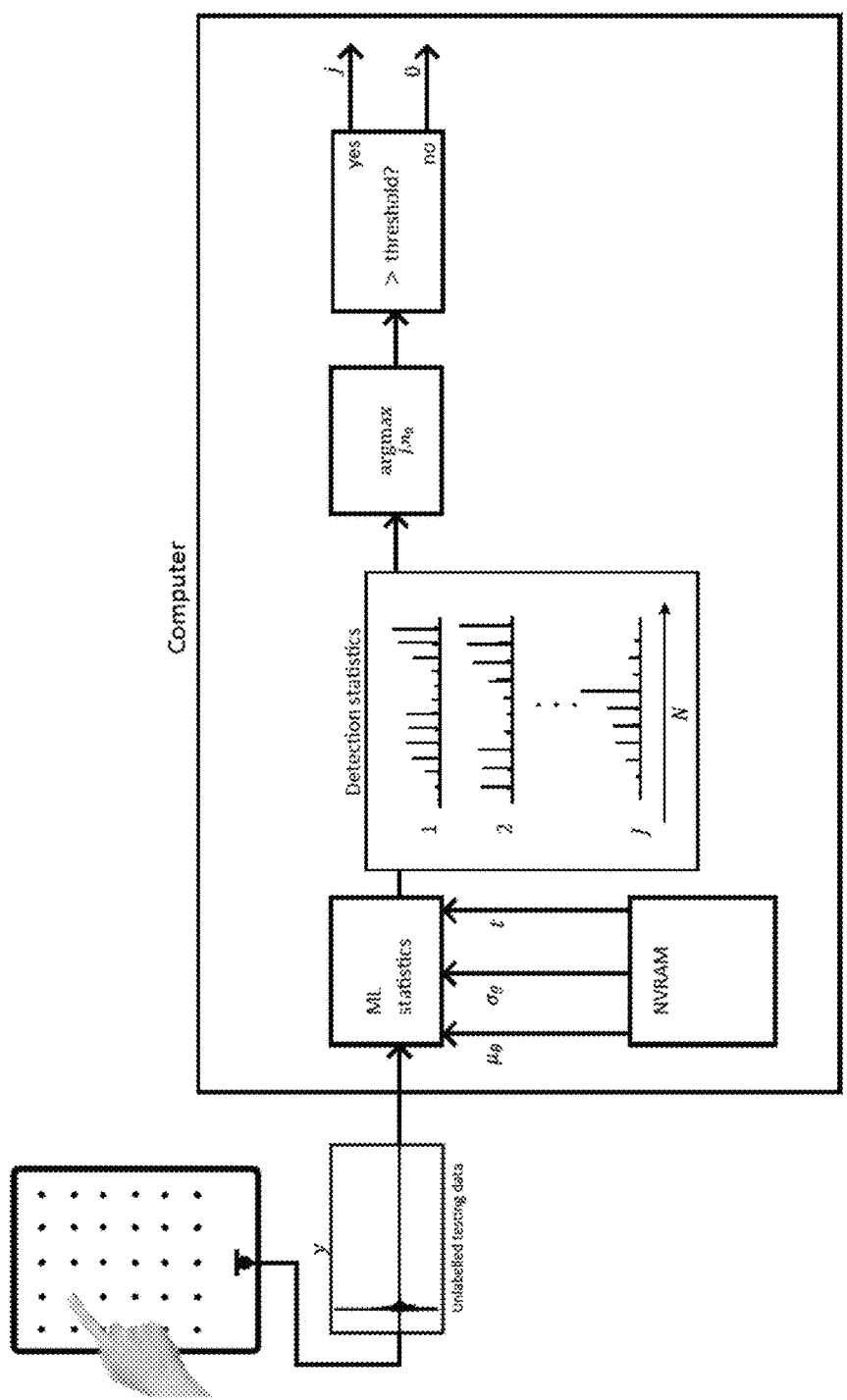
FIG. 2 shows a block diagram of an electronic device configured to implement a procedure for identifying a most likely tapped region of a plurality of tap-sensing regions of the device, according to an embodiment of an aspect of the invention.
Figure 11:
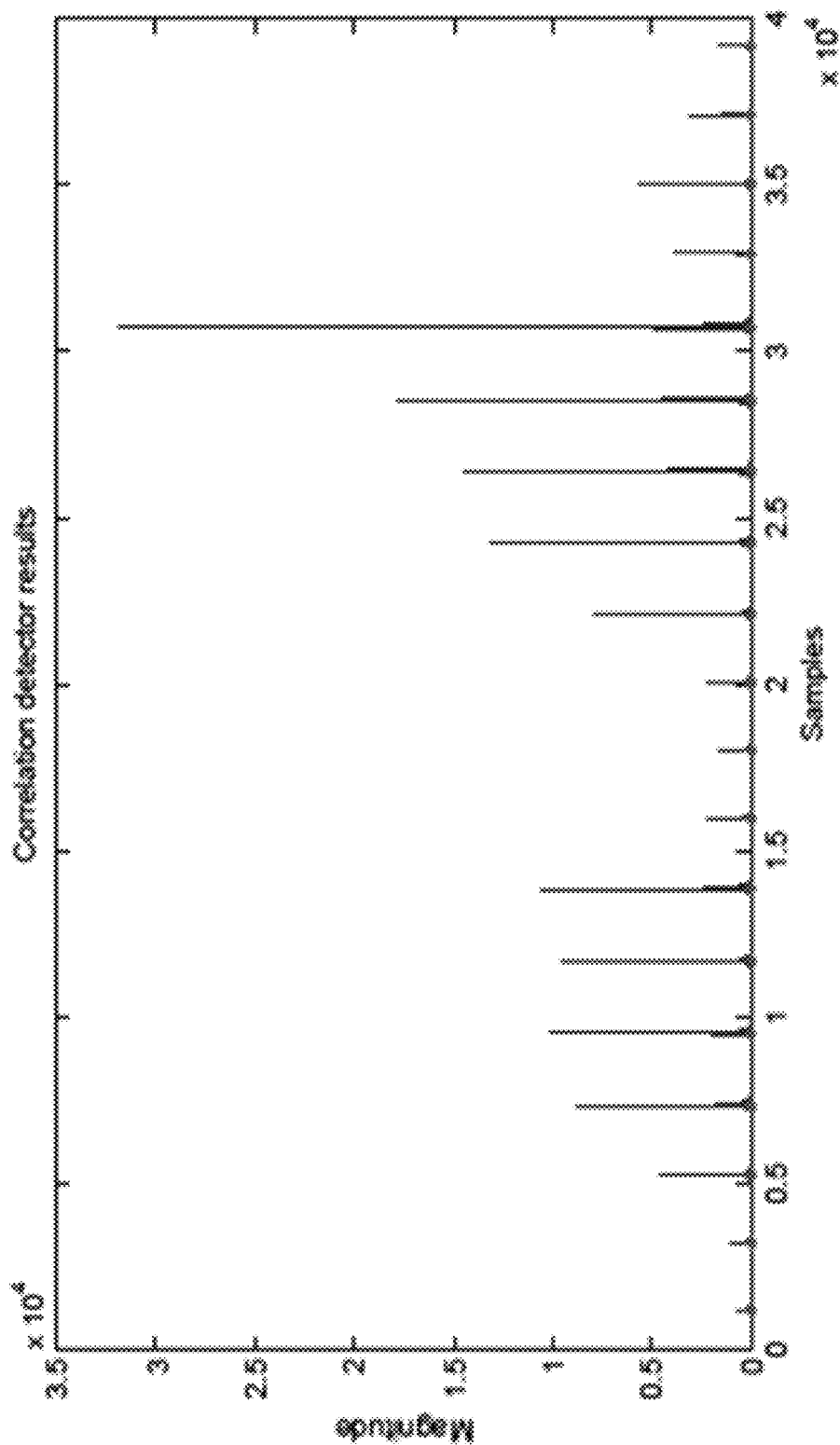
FIG. 11 illustrates example output from a correlation detector implementing a probabilistic correlation using a multicomponent model having mean value data, covariance data, and basis function data defining sets of basis functions as inputs, as illustrated in the block diagram of FIG. 2 (dots indicating detected taps)
Figure 13:
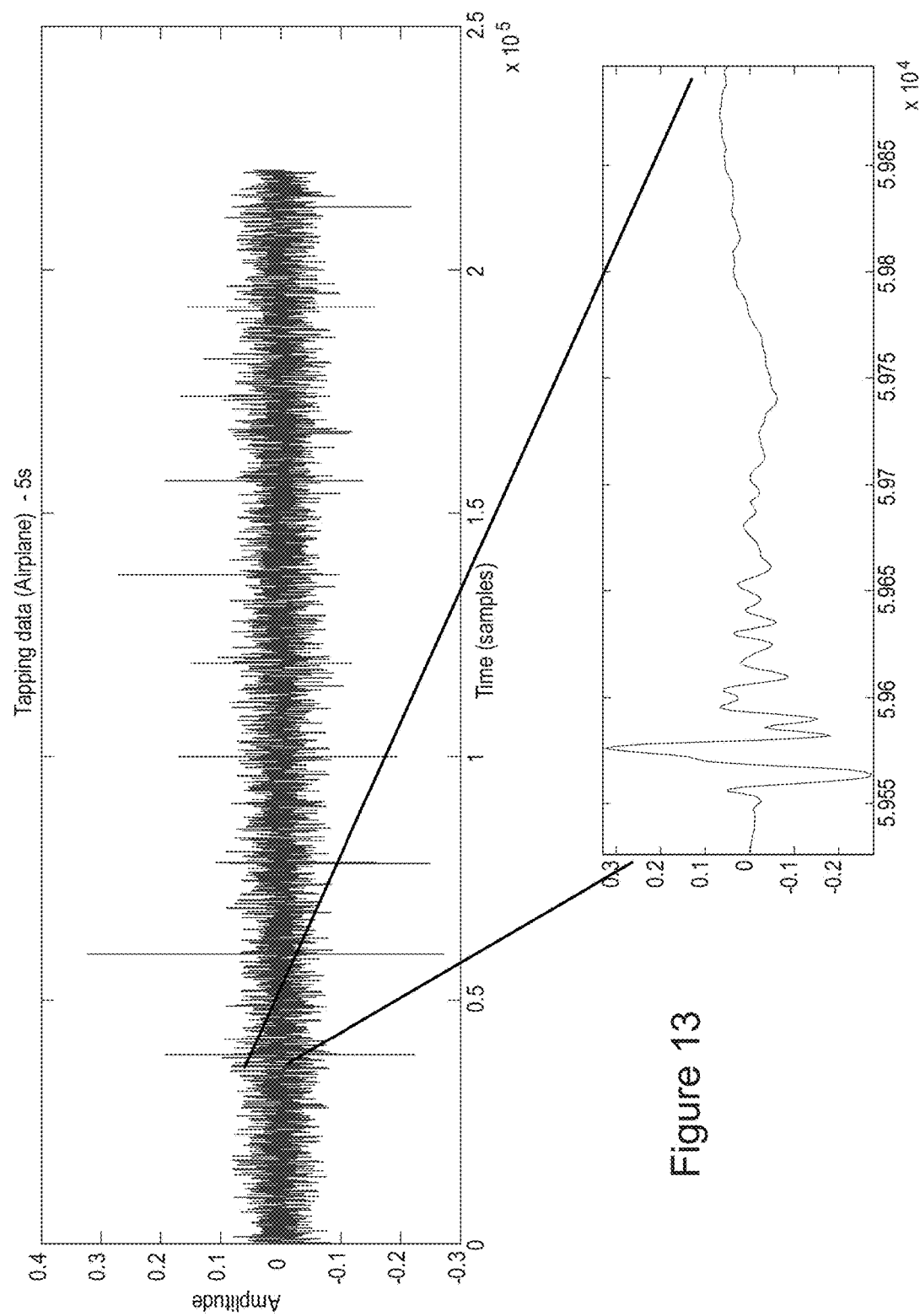
FIG. 13 shows an example of a tap waveform embedded in a high level of background noise.
Figure 14:
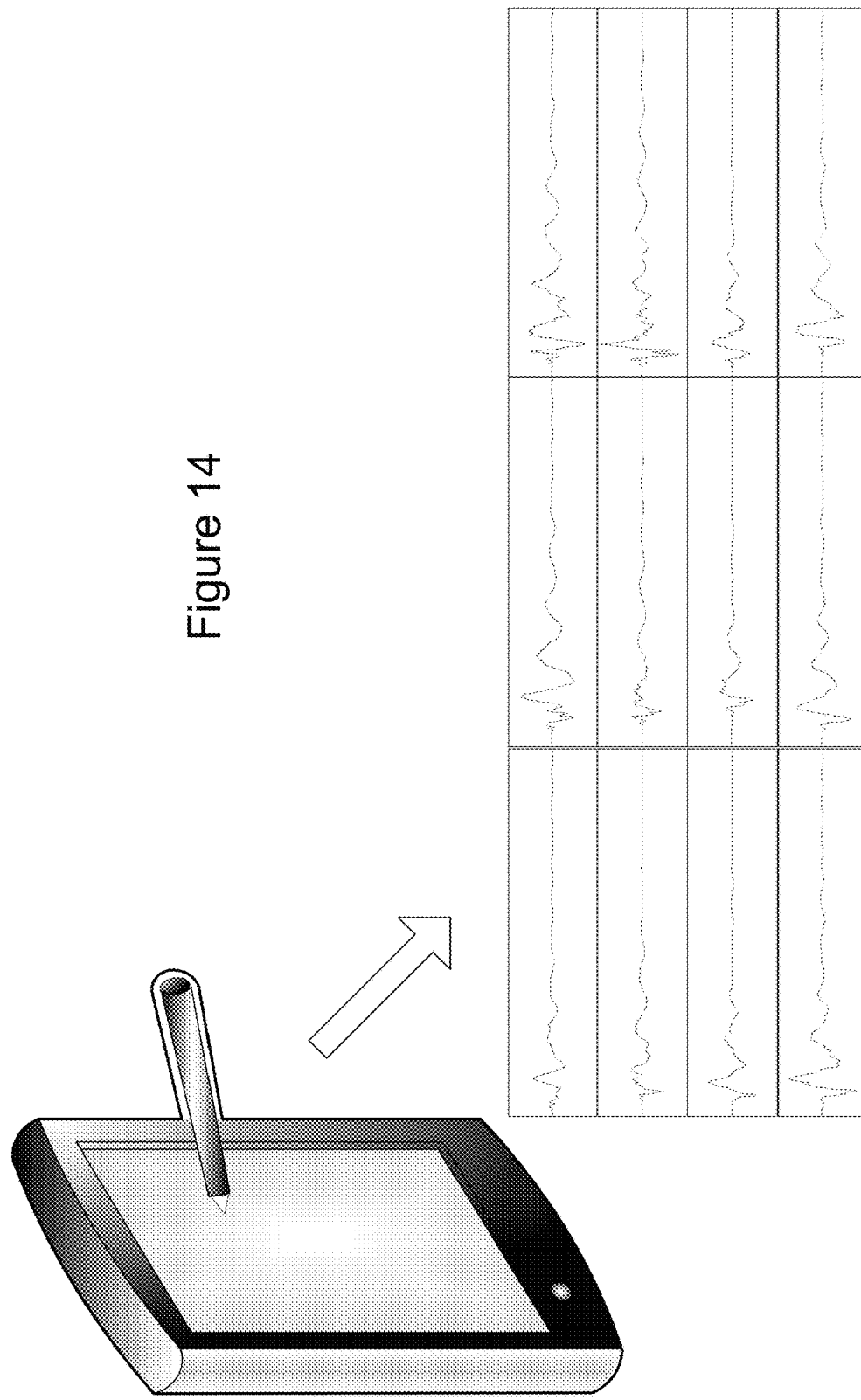
FIG. 14 shows examples of mean value waveforms (templates) for 12 different tap-sensitive regions on an example mobile phone.

FIG. 2 shows a block diagram of a portable electronic device configured to implement this method. FIG. 13 shows an example of the acoustic signal of a tap embedded in noise; FIG. 14 shows example basis functions (templates); and FIG. 11 shows example detection statistics output data for the system of FIG. 2 (dots indicate a detected tap).

In more detail, FIG. 2 shows a block diagram of the implementation of the use/testing stage of the algorithm. The diagram shows how a tap y incident on the tapping device is picked up by the microphone on the device and transmitted to a computer. Within the computer the algorithm calculates the statistics, as outlined below, utilizing data from the training stage of the algorithm. The statistics of the signal is then evaluated and the most probable class or spot is displayed to the user unless the models do not yield a sufficiently high probability, as determined by a threshold, in which case no tap will be registered.

3. Testing/Use Mode for a Gaussian Process Model

An alternative testing mode is obtained for the Gaussian process model. Recall that in this case only the means $\hat{\mu}^j$ and covariances $\hat{C}^j$ are required, so no eigenvector-eigenvalue decomposition is performed in the training stage (otherwise training is identical). Testing then proceeds exactly as before, but using a different formula for the likelihood function $p(y|j,n_0)$:

For each chunk of data y, of length N samples, loop over possible tap times $n_0$ and tapping position j:

Determine background noise variance [this is the simplest version—just assume that background noise variance equals received signal energy]:

$$\sigma_v^2 = \frac{1}{N} \sum_{n=1}^{N} y_n^2$$

For j=1:J
For $n_0$=1:N
Compute a likelihood-ratio function:

$$p(y \mid j, n_0) =$$

$$\frac{1}{(2\pi)^{N/2} |C^j(n_0) + \Sigma_v|^{1/2}} \exp\left((y - \mu^j(n_0))^T (C^j(n_0) + \Sigma_v)^{-1} (y - \mu^j(n_0))\right)$$

$$\frac{p(y \mid j, n_0)}{p(y \mid j=0, n_0)} =$$

$$\frac{\frac{1}{|C^j(n_0) + \Sigma_v|^{1/2}} \exp\left((y - \mu^j(n_0))^T (C^j(n_0) + \Sigma_v)^{-1} (y - \mu^j(n_0))\right)}{\frac{1}{|\Sigma_v|^{1/2}} \exp(y^T \Sigma_v^{-1} y)}$$

Compute bayesian posterior probability ratio $$\frac{p(j, n_0 \mid y)}{p(j=0, n_0 \mid y)} = \frac{p(y \mid j, n_0) p(j, n_0)}{p(y \mid j=0, n_0) p(j=0, n_0)} \quad (2)$$

End
End
Find maximum of $$\frac{p(j, n_0 \mid y)}{p(j=0, n_0 \mid y)}$$

over all j>0 and $n_0$. If the maximum exceeds a fixed threshold, return that detected j and $n_0$ pair. Otherwise, return no detection (j=0).

4. Testing Mode for a Simple Case

Here we give a very specific implementation for a simple case where noise is iid Gaussian, multi-component model is assumed with orthogonal components and the prior coefficient means are set to zero. The derivation of this is given above, and the algorithm is repeated there.

Arrays are treated as column vectors throughout and dimensions are given as columns×rows.

Start of Algorithm:
Pre-trained/computed and stored in NVRAM for j=1:J
    $t^j$ (N by I—dimensional array)
    $\mu^j$ (N—dimensional array)
    $\sigma_\Theta^j$, (I—dimensional array containing elements $\sigma_{Theta_i^j}$)
    LOGPRIORRRATIO=log($\alpha$)−log(1−$\alpha$)−log(J) (scalar)
    TMU$^j$=$t^{jT}\mu^j$, I—dimensional array
    MUTMU=$\mu^{jT}\mu^j$, (scalar variable)
For each chunk of data y, of length N time samples:
Determine background noise variance [this is the simplest version—just assume that background noise variance equals received signal energy]:

$$\sigma_v^2 = \frac{1}{N} \sum_{n=1}^{N} y_n^2$$

For j=1:J
Compute 'FILTERYWITHT':
For i=1:I
Apply an FIR filter to the data y, the filter having coefficients equal to the corresponding (time-reversed) component waveform for tapping position j and component i, i.e. the time-reversed version of $t_i^j$. The output is an N-dimensional vector FILTERYWITHT$_i^j$ for a particular value of j and i, and for all values of $n_0$=1:N.
End
Compute 'FILTERYWITHMU':
Apply an FIR filter to the data y, the filter having coefficients equal to the corresponding (time-reversed) mean process vector for tapping position j, i.e. the time-reversed version of $\mu^j$. The output is an N-dimensional vector FILTERWITHMU$^j$ for a particular value of j, and for all values of $n_0$=1:N.

For $n_0$=1:N

Calculate β, a vector of length I:

$$\text{BETA} = \frac{1}{\sigma_v^2}(\text{FILTERYWITHT}^j(n_0) - \text{TMU}^j)$$

Compute $\hat{\Theta}^j$, a vector of length I:

$$\text{THETA} = \sum_{i=1}^{I} \frac{\sigma_{\Theta_i}^{j2}}{\sigma_v^2 + \sigma_{\Theta_i}^{j2}}(\text{FILTERYWITHT}_i^j(n_0) - \text{TMU}_i^j)$$

Compute:

$$\text{BETAPHIBETA} = \sum_{i=1}^{I} \text{BETA}_i \text{THETA}_i^j$$

$$\text{YTSIGMAVMU} = \frac{1}{\sigma_v^2} \text{FILTERYWITHMU}^j(n_0)$$

$$\text{DETSIGTHETAPHI} = \prod_{i=1}^{I} \frac{\sigma_v}{\sqrt{\sigma_v^2 + \sigma_{\Theta_i}^{j2}}}$$

Compute log-likelihood ratio:

LOGLIKERATIO=-log(DETSIGTHETAPHI)-½(-BETAPHIBETA-2×YTSIGMAVMU+MUTMU/$\sigma_v^2$)

Compute Bayesian log-posterior probability ratio and store in as an N by J-dimensional array in RAM:

LOGPOSTRATIO$_{n_0}{}^j$=LOGLIKERATIO+LOGPRIORRATIO

End

End

Find indices $n_0$, $\hat{j}$, of maximum element of array LOGPOSTRATIO. If this maximum exceeds a fixed threshold, return $\hat{j}$ as the detected tap position and $n_0$ as the detected tap time. Otherwise, return 'no tap detected'.

End of Algorithm

5. Other Versions of the Testing Algorithm

Other versions of the likelihood function, such as non-Gaussian models for the taps and/or the background noise, or the scaled mixture versions of the models also fit into a testing framework with a corresponding structure to that above, simply by replacing the calculation of the terms $p(y|j,n_0)$ and $p(y|j=0,n_0)$ with their alternative versions, for example using equation (6) for $p(y|j,n_0)$ when the scaled Gaussian mixture model is to be implemented.

We have thus described a device as having one or more acoustical sensors and an algorithm which classifies tapping positions in the presence of user and environmental variability through use of a statistical model. In embodiments the model is a non-stationary random process having different parameters for each tapping position, time-shifted to coincide with the time of arrival of the tapping waveform: $\{x_n; n_0, j\}$ where $n_0$ is the tapping time and j is the tapping position.

The random process may a Gaussian Process whose mean and/or covariance functions are parameterised differently for each tapping position:

$$p(x|j,n_0)=N(\mu^j(n_0)),C^j(n_0))$$

where $$\mu^j(n_0)=[0 \ldots 0\mu_1^j\mu_2^j \ldots \mu_{M_j}^j 0 \ldots 0]^T$$

such that the first non-zero element of $\mu^j(n_0)$ is at position $n_0$ and the n,m the element of $C^j(n_0)$ is defined $$c_{n,m}^j(n_0) = \begin{cases} c^j(n-n_0, m-n_0), & 0 < n-n_0, m-n_0 < M_j \\ 0, & \text{otherwise} \end{cases}$$

In embodiments the statistical model is a random probability mixture of processes:

$$x'=\kappa x$$

More particularly the statistical model may be a random probability mixture of Gaussian processes:

$$p(x'|j,n_0)=\int N(\kappa\mu^j(n_0)),\kappa^2 C^j(n_0))p(\kappa)d\kappa$$

The statistical model may comprise multiple waveform components, each of which models one aspect of variability in the tapping process, and where the tapping waveform is modelled as a random combination of the individual components. In particular in embodiments the tapping random process is modelled as a linear weighted sum of the individual component waveforms and (optionally) a mean process:

$$x = \sum_{i=1}^{I} \theta_i^j t_i^j(n_0) + \mu^j(n_0) \quad (2)$$

where the weights $\theta_i^j$ are random variables. More particularly the random parameters are multivariate Gaussian:

$$p(\Theta^j|n_0,j)=N(\mu_\Theta^j,\Sigma_\Theta^j), \quad (3)$$

In a statistical model as described above an additive background noise process v may be modelled as:

$$y=x+v$$

which may be non-Gaussian or Gaussian, in a Gaussian example:

$$v \sim N(0,\Sigma_v)$$

For example in which the background is iid Gaussian, i.e. $\Sigma_v=\sigma_v^2 I_N$.

The background may be modelled as a correlated process, for example an AR or ARMA process, or general Gaussian process. The background parameters may be estimated from surrounding (non-tap, pure background) data or jointly from the whole data including the tap, optionally using outlier robust statistical methods, or by probabilistic modelling.

Additionally or alternatively a classifier may be employed, in particular which uses measured tapping waveforms and any of the above statistical models (with or without background modelling) to determine (either or both) when ($n_0$) and where (j) the user has tapped on the device. Likelihood-based or classical decision methods may be used to perform classification. Alternatively classification may be based on the Bayesian posterior probability $$p(j,n_0|y) \propto p(y|j,n_0)p(j,n_0) \quad (4)$$

In particular in which the Maximum a Posteriori classification is chosen, for j>=0:

$$\hat{j}, n_0 = \text{argmax}_{j,n_0} p(j, n_0 \mid y)$$

or $$\hat{j} = \text{argmax}_j p(j \mid y) = \text{argmax}_j \sum_{n_0=0}^{N} p(j, n_0 \mid y)$$

Alternatively the Maximum Posterior probability ratio classification is chosen, for j>0:

$$\hat{j}, n_0 = \text{argmax}_{j,n_0} \frac{p(j, n_0 \mid y)}{p(j = 0, n_0 \mid y)}$$

or $$\hat{j} = \text{argmax}_j p(j \mid y) = \text{argmax}_j \frac{\sum_{n=0}^{N} p(j, n_0 \mid y)}{\sum_{n_0=0}^{N} p(j = 0, n_0 \mid y)}$$

and no tap classification is made (j=0) unless the maximum value exceeds a pre-specified threshold.

Alternatively the classification is made using Bayesian Decision Theory:

$$\hat{j}^{MR} = \text{argmin}_j \sum_{j=1}^{J} C(\hat{j}, j) p(j \mid y)$$

In the above procedures $p(y \mid j, n_0)$ may be computed as:

$$p(y \mid j, n_0) = N(\mu^j(n_0)), C^j(n_0) + \Sigma_v)$$

Alternatively $p(y \mid j, n_0)$ may be computed for j>0 as:

$$p(y \mid j, n_0) = \frac{1}{(|\Sigma_\Theta|)^{1/2} (2\pi)^{N/2} |\Sigma_v|^{1/2} |\Phi|^{1/2}}$$

$$\exp\left(-\frac{1}{2}\left(-\beta^T \Phi^{-1} \beta + \mu_\Theta^{jT} \sum_{\Theta}^{j-1} \mu_\Theta^j + (y - \mu^j(n_0))^T \sum_{v}^{-1} (y - \mu^j(n_0))\right)\right)$$

$$\beta = \sum_{\Theta}^{j-1} \mu_\Theta^j + t^j(n_0)^T \sum_{v}^{-1} (y - \mu^j(n_0))$$

$$\Phi = \left(\sum_{\Theta}^{j-1} + t^j(n_0)^T \sum_{v}^{-1} t^j(n_0)\right)$$

$$\hat{\Theta}^j = \Phi^{-1} \beta$$

In the above $p(y \mid j, n_0)/p(y \mid j=0, n_0)$ may be computed for j>0 as:

$$\frac{p(y \mid j, n_0)}{p(y \mid j = 0, n_0)} = \frac{1}{|\Sigma_\Theta|^{1/2} |\Phi|^{1/2}}$$

$$\exp\left(-\frac{1}{2}\left(-\beta^T \Phi^{-1} \beta + \mu_\Theta^{jT} \sum_{\Theta}^{j-1} \mu_\Theta^j - 2y^T \sum_{v}^{-1} \mu^j(n_0) + \mu^j(n_0)^T \sum_{v}^{-1} \mu^j(n_0)\right)\right)$$

$$\beta = \sum_{\Theta}^{j-1} \mu_\Theta^j + t^j(n_0)^T \sum_{v}^{-1} (y - \mu^j(n_0))$$

$$\Phi = \left(\sum_{\Theta}^{j-1} + t^j(n_0)^T \sum_{v}^{-1} t^j(n_0)\right)$$

$$\hat{\Theta}^j = \Phi^{-1} \beta$$

In any of the above procedures labelled training data may be obtained from one or more users tapping in one or more different styles and in one or more environmental conditions. Preferably the labelled training tap data are detected and time-aligned using e.g. correlation-based detector (matched filter). Optionally the aligned data are preconditioned by energy or peak amplitude normalisation. In embodiments the mean and covariance functions are learned from labelled and aligned training data by:

$$\hat{\mu}^j = \frac{1}{N^j} \sum_k x_k^j$$

$$C^j = \frac{1}{N^j} \sum_k (x_k^j - \hat{\mu}^j)(x_k^j - \hat{\mu}^j)^T$$

Where the tapping random process is modelled as a linear weighted sum of the individual component waveforms components and prior parameter variances may be obtained by Principal Components Analysis of the estimated covariance matrix.

There are other more variants on the training that may be employed as previously indicated including, for example: randomised unlabelled training over whole surface to get a single set of component templates (plus estimation of prior parameters for each j from labelled training data); adaptation of templates over time, detection of off-grid taps; multiple microphones; a low complexity detection stage. The training and/or test/use data may be pre-conditioned by high-pass/low-pass filtering in order to attenuate low/high frequency interference.

There are further options. For example one could employ a basic template based detector (eg MAP maximum apriori probability and/or ML maximum likelihood), and a corresponding training algorithm, implemented in a mobile device using matched filtering technology. The maths of the testing/use (tap identification) phase are a special case of the multiple component model when J=1 and there is no mean process $\mu^j$.

We have described, inter alia, a multiple component-based detector and its training algorithm. This algorithm is aimed at modelling variability between taps at the same physical point. Lots of training data is obtained and multiple components are estimated for each tapping point—this can be done in the simplest case by a Principal Components Analysis of the training taps—leading to orthogonal components, or using a more sophisticated model that leads to dependent components. As described, there are configuration options available—for example, learn different components for each tapping point, or have a common pool of components for all tapping points.

In embodiments we model the background interference directly, learning the level of it automatically from non-tapping parts of the signal, but modelling it as white Gaussian noise. A possible extension is to learn the spectrum or autocorrelation function of the noise and build this into the detector—in effect using coloured rather than white noise. The maths can straightforwardly be adapted for this case. Once again, the spectrum can be estimated from non-tapping data.

Other options include: High pass filtering/pre-processing to remove low-frequency variability; using sparse training and interpolation method applied in a basic single template mode; and using sparse training and interpolation, applied to PCA-type multiple component mode.

The tap-characterising waveforms may change over time due to heavy use or damage to the phone. Thus in a multiple component model one could adapt the templates/components (basis functions) with time, preferably rather slowly. One could also provide a re-start function that recognises that the system is no longer working and that new tapping data needs to be input by the user for recalibration purposes. Additionally or alternatively methods for detecting 'off-grid' taps could be implemented, for example including randomised (location) training to learn the template components. Similarly methods for providing/using data for dealing with multiple temperatures and multiple handsets could be implemented.

As previously described, computational savings may be made by implementing a reduced-complexity detection stage. The methods may be extended to provide scaling parameter estimation/marginalisation for multi-component model and/or classification in the presence of clipping/saturation.

Paired Device Acoustic Touch Sensing

We now describe examples of paired device touch sensing which may, in embodiments, implement a touch/tap-sensing algorithm as described above.

Figure 15:
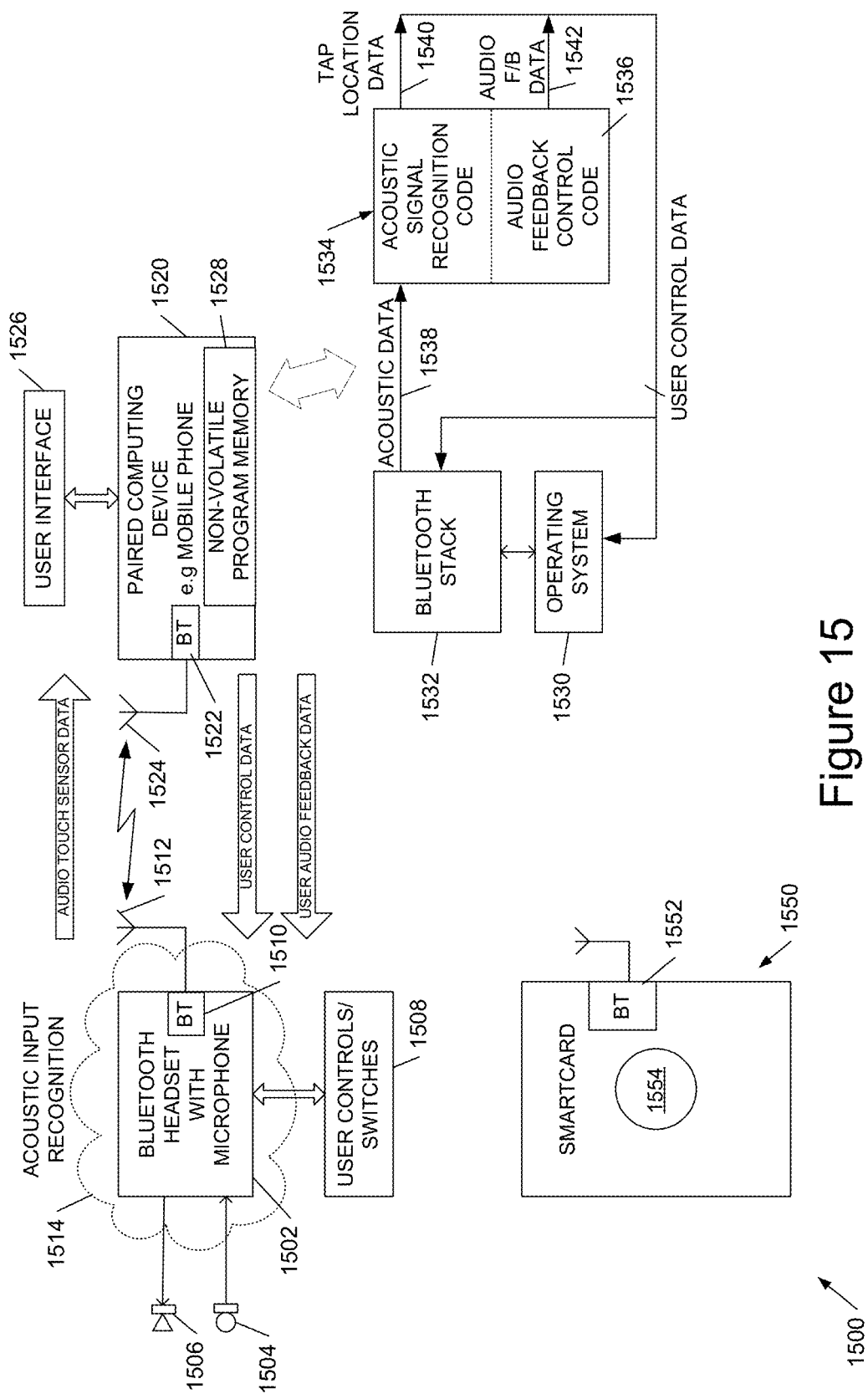
FIG. 15 shows a system for remotely enabling touch-sensing operation of a first electronic device using a second electronic device, according to an embodiment of the invention.

Thus referring now to FIG. 15, this shows an embodiment of a touch sensing system 1500 according to the present invention. The system comprises a first electronic device 1502 including a microphone 1504 and, in embodiments, a speaker or earpiece 1506 as well as optional user controls/switches 1508. In the illustrated embodiment the first electronic device 1502 is a Bluetooth headset. The headset has a Bluetooth communications interface 1510 coupled to an (internal) antenna 1512. The outer surface of the device 1502 is made touch sensitive by the acoustic input recognition techniques we describe, as illustrated by dashed cloud 1514.

Device 1502 has a Bluetooth (registered trade mark) communications link with a second electronic device 1520, in this example a mobile phone with which the Bluetooth headset is paired. The second device 1520 also includes a Bluetooth (registered trademark) interface 1522 and antenna 1524, as well as, in general, having its own user interface 1526. The device 1520 also includes a processor and working memory (not shown) as well as non-volatile program memory 1528, for example Flash memory.

In embodiments the programme memory 1528 stores (simplified) operating system code 1530 for operating the mobile phone, including providing communications interfaces to a mobile phone network, a user interface, typically an internet interface, and many other functions such as are well known to those skilled in the art. The operating system is also coupled to a Bluetooth code stack 1532, shown explicitly in FIG. 15. The code and non-volatile programme memory 1528 also includes acoustic signal recognition code 1534, for example as described above, optionally also including audio feedback control code 1536.

In operation acoustic data from microphone 1504 is transmitted over the Bluetooth communications link and is processed and forwarded by Bluetooth stack 1534 to provide an acoustic data input 1538 to the acoustic signal recognition code. This code outputs user control data identifying a user operation on the first device 1502 comprising, for example tap location and/or sequence data and/or swipe data or other acoustic touch sense data. This user control data may be provided to the mobile phone operating system 1530, for example to perform an action such as a directory lookup or any of the other numerous actions with which the skilled person will be familiar with. Additionally or alternatively the user control code is provided to the Bluetooth stack 1532 for forwarding over the Bluetooth link to the first electronic device (Bluetooth headset) to control this first device. Optionally the audio feedback control code outputs audio feedback data 1542 which may either comprise encoded voice data or a pointer or similar identifier of a voice, tone or other audio feedback signal. This data may be passed via the Bluetooth stack 1532 to the headset 1502 to provide audio confirmation of a command and/or audio output resulting from execution of the selected user operation. The skilled person will recognise that other forms of feedback, for example visual feedback via the first electronic device, may additionally or alternatively be provided.

One or more first electronic devices may be in communication with the computing device 1520. Thus additionally or alternatively to device 1502 a device such as smartcard 1550 may be coupled to computing device 1520, again, in this example, via a Bluetooth interface 1552. The illustrated smartcard example bares a piezoelectric sensor 1554 to detect an acoustic tap or tap sequence on the smartcard and to transmit data to the computing device 1520 for processing the tap location/sequence and hence use up operation, identification.

The skilled person will recognise that although in preferred embodiments the connection between devices 1502, 1550 and the computing device 1520 is wireless, this may alternatively be a wired connection, for example in the case of a wired headset.

The previously described touch/tap-sensing techniques may be employed in for acoustic tap (and tap sequence) sensing. Similar techniques may be employed for swipe sensing, although potentially this may be made easier by providing a texture or pattern on the surface of an electronic device, such as a set or pattern of raised dimples or ribs which generate a characteristic acoustic or vibration signal when swiped. (The direction and/or location and/or length of a swipe may also optionally be encoded, for example by changing the spacing of the pattern with changing location on the surface of the device). Thus, broadly speaking, some preferred approaches involve a training phase in which one or more users taps repeatedly in one or more tapping modalities (stylus, finger, different temperatures) at specified locations on the device—e.g. on a carefully measured lattice of points on the screen surface of a mobile phone. (It has been found that there is variability caused by changes of temperature and change of device, e.g. different mobile phones of the same model). A training algorithm then learns templates and parameters used for subsequent classification of the data. Although such techniques are particularly advantageous, paired device acoustic touch sensing may also be used with other forms of acoustic tap or swipe sensing, and some suggestions are given in our WO2009/093056, to which reference may be made.

Adaptive Acoustic Touch Sensing

We now describe techniques for determining an automatic adaptive threshold in acoustic tap detection which may, in embodiments, employ a touch/tap-sensing algorithm as described above.

In embodiments a method for determining an adaptive threshold for detection of taps in unknown background noise environments uses a detection method which outputs a series of detection values (e.g. probabilities), one for each data point in the series—such as the Bayesian detector we have previously described in WO2012/025733.

High detection (probability values) indicate a potential tap, but how does one determine a suitable threshold for declaring a detected tap, especially when the background characteristics are unknown and do not necessarily fit with the assumptions of the detection model?

In embodiments the steps are:
1. Find a piece of background noise where there are unlikely to be genuine taps
2. Add to this background noise one or more examples from the training library of 'clean' taps, at one or more time locations in the background audio.
3. Apply a detection algorithm (e.g. the patented Bayesian tap detector) to the waveform(s) generated in 2. And also to the pure background noise data (without taps added).
4. Look at the detector output(s) from 3. and use the magnitudes to determine an appropriate threshold for the detector running on real data with potential real taps. For example, calculate the maximum detector output from just background noise in 3., then calculate the minimum detector output at the time location of a synthetically added tap from 3. and compute a threshold some fraction of the distance between these, say halfway between them.

Extensions include determining thresholds for a multi-spot classifier by adding in examples from the training library for different spots and computing thresholds for each tap type detector output.

One can also use the method to effectively deactivate the detector in regions where the minimum and maximum values in step (4) are too close to reliably make detections.

In one embodiment step 1 is implemented as follows: take a buffer of data, run a detector on it (e.g. a correlation or Bayes detector) and cut out the sample locations in a short region around where the detector output is highest. The remaining data can be treated as 'background' data and used in step (2). One may not wish to run detector(s) in step (2) over boundaries where data was cut out, but this can be addressed in the software.

In another embodiment step 1 performs the following: use other sensor(s) e.g. accelerometer or gyro to determine regions with little or no tap activity, and treat these as the background noise in step (1).

This has been implemented in Matlab® and Android® environments.

Figure 16:
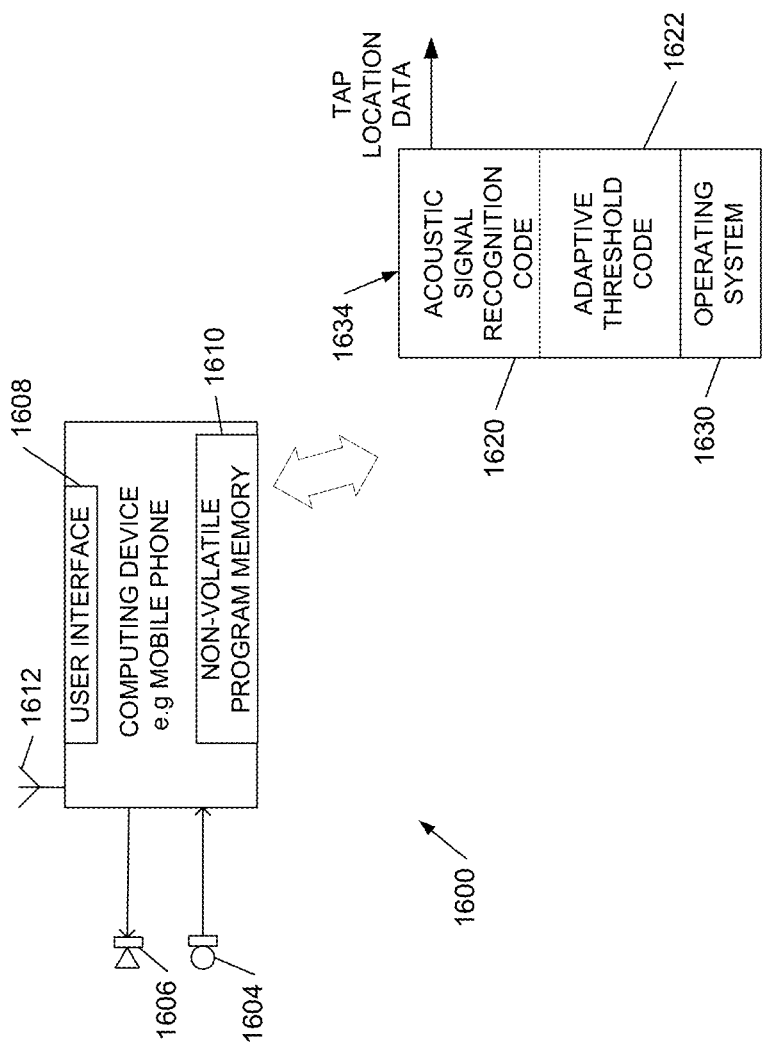
FIG. 16 shows a system for remotely enabling touch-sensing operation of a first electronic device using a second electronic device, according to an embodiment of the invention.

Referring now to FIG. 16, this shows an embodiment of an adaptive touch sensing device 1600 according to the present invention. The device comprises a microphone 1604, a speaker or earpiece 1606, user controls/switches 1608, an antenna 1612, as well as a processor and working memory (not shown), and non-volatile program memory 1610, for example Flash memory.

In embodiments the programme memory 1610 stores operating system code 1630 for operating the mobile phone, including providing communications interfaces to a mobile phone network, a user interface, typically an internet interface, and many other functions such as are well known to those skilled in the art. The code and non-volatile programme memory 1610 also includes acoustic signal recognition code 1620, for example as described above, and adaptive threshold determination code 1622.

The skilled person will appreciate that the previously described Bayesian tap detection procedure is merely one example of a tap detection procedure with which embodiments of the adaptive touch detection technique may be employed, and that the technique is applicable to any type of tap detection procedure which produces tap probability data at time intervals.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A user interface system for a mobile phone, wherein the system is configured to detect the location of a tap on the mobile phone having at least one acoustic sensor, wherein the system is configured to perform operations comprising:
    storing a set of labelled training data, said set of labelled training data comprising digitised waveform data of waveforms captured from said acoustic sensor for taps at a plurality of different locations on said mobile phone in combination with location data indicating for each said waveform the location of the tap;
    processing said set of labelled training data to determine, for each of a plurality of tap-sensing regions of said mobile phone, mean value data and covariance data for at least two said waveforms captured from taps in the said region, said mean value data defining a mean of said at least two waveforms and said covariance data defining covariance of said at least two waveforms;
    capturing tap data comprising a digitised waveform of a tap at an unknown location captured by said acoustic sensor;
    determining a tapped region of said mobile phone from said tap data and from said mean value data and said covariance data from said plurality of tap-sensing regions; and
    outputting data representing detection of a user tap on the tapped region for controlling a function of the mobile phone;
    wherein said processing of said set of labelled training data further comprises decomposing said covariance of said at least two waveforms into a plurality of basis functions each with a respective weighting, wherein said covariance data comprises data defining said respective weightings and providing basis function data defining said basis functions; and
    wherein said determining of said tapped region comprises determining said tapped region from said tap data and from said mean value data and covariance data from said plurality of tap-sensing regions and from said basis function data.

2. A user interface system as claimed in claim 1 wherein said determining of said tapped region comprises determining from said captured tap data and from said mean value data and said covariance data from said plurality of tap-sensing regions, probability data defining a probability, for each of said tap-sensing regions, that said unknown location is in said region; and
    determining a said tapped region of said mobile phone for said unknown location from said probability data.

3. A user interface system as claimed in claim 2 wherein said determining of said probability data comprises determining, for each said region and for each of a plurality of possible tap times, a probability of capturing said captured tap data.

4. A user interface system as claimed in claim 3 wherein the system is further configured to perform operations comprising pre-processing said captured tap data to identify a subset of said possible tap times for said determining of said probability data.

5. A user interface system as claimed in claim 3 wherein said determining of said tapped region further comprises scaling said probability for each of said regions by one or both of: i) a probability of no tap having been captured; and ii) a prior probability of a said tap in the region for each of said plurality of possible tap times.

6. A user interface system as claimed in claim 1 wherein a different set of said functions is determined for each said region.

7. A user interface system as claimed in claim 1 further comprising determining at least one said basis function common to said plurality of tap-sensing regions.

8. A user interface system as claimed in claim 1 wherein said determining of said tapped region comprises, for each said region, estimating a set parameters to represent said captured data in terms of said basis functions for said region, and determining said tapped region by classifying said estimated sets of parameters for said regions.

9. A user interface system as claimed in claim 1 wherein said determining of said tapped region comprises operating on said captured tap data with a filter using each of said basis functions.

10. A user interface system as claimed in claim 1 wherein said determining of said probability data comprises determining, for each said region and for each of a plurality of possible tap times, a probability of capturing said captured tap data, and wherein said determining of said tapped region comprises determining, for each said region, j, and for a set of possible tap times n0, and for captured tap data y, a said probability $p(y|j,n_0)$, or a log likelihood ratio dependent on said probability $p(y|j,n_0)$, by applying to said data y a first FIR filter having coefficients determined by values of t, where t represents a said set of basis functions for region j, and a second FIR filter having coefficients determined by values of said mean value data.

11. A user interface system as claimed in claim 1 wherein the system is further configured to perform operations comprising determining a posterior tap probability $$p(j,n_0|y) \propto p(y|j,n_0)p(j,n_0)$$

for a set of time offsets $n_0$ and tap positions j and determining an estimated tap position j at estimated time offset $n^o$ from:

$$\hat{j},\hat{n}_0 = \mathrm{argmax}_{j,n_0} p(j,n_0|y).$$

12. A user interface system as claimed in claim 1 wherein the system is further configured to perform operations comprising modelling at least part of said digitised waveform of a tap as $$\sum_{i=1}^{I} \theta_i^j t_i^j(n_0)$$

where $\theta_i^j$ are weights, and where $t_i^j(n_0)$ is the i th template component of a set of I waveform template components defined with reference to a tap starting time $n_0$.

* * * * *